(12) United States Patent
Galceran Mestres et al.

(10) Patent No.: US 11,186,486 B2
(45) Date of Patent: Nov. 30, 2021

(54) DELITHIATION OF CARBON FREE OLIVINE BY ADDITION OF CARBON

(71) Applicants: HYDRO-QUÉBEC, Québec (CA); CIC ENERGIGUNE, Miñano Álava (ES)

(72) Inventors: Montserrat Galceran Mestres, Álava (ES); Montserrat Casas Cabanas, Miñano Álava (ES); Abdelbast Guerfi, Québec (CA); Michel Armand, Miñano Álava (ES); Karim Zaghib, Québec (CA)

(73) Assignees: HYDRO-QUÉBEC, Montreal (CA); CIC ENERGIGUNE, Miñano Álava (ES)

( * ) Notice: Subject to any disclaimer, the term of this patent is extended or adjusted under 35 U.S.C. 154(b) by 200 days.

(21) Appl. No.: 16/465,656

(22) PCT Filed: Dec. 14, 2017

(86) PCT No.: PCT/IB2017/057971
§ 371 (c)(1),
(2) Date: May 31, 2019

(87) PCT Pub. No.: WO2018/109727
PCT Pub. Date: Jun. 21, 2018

(65) Prior Publication Data
US 2020/0024140 A1 Jan. 23, 2020

Related U.S. Application Data

(60) Provisional application No. 62/434,661, filed on Dec. 15, 2016.

(51) Int. Cl.
*C01B 25/45* (2006.01)

(52) U.S. Cl.
CPC .................................. *C01B 25/45* (2013.01)

(58) Field of Classification Search
CPC ...................................................... C01B 25/45
USPC ............................................................ 423/306
See application file for complete search history.

(56) References Cited

U.S. PATENT DOCUMENTS

| 8,282,691 B2 * | 10/2012 | Goodenough | H01M 4/136 |
| | | | 29/623.1 |
| 11,075,370 B2 * | 7/2021 | Ryan | H01M 4/0428 |
| 2002/0102459 A1 * | 8/2002 | Hosoya | H01M 10/0525 |
| | | | 429/221 |

(Continued)

FOREIGN PATENT DOCUMENTS

| EP | 2438105 A1 | 4/2012 |
| KR | 2016136809 A * | 11/2016 |

(Continued)

OTHER PUBLICATIONS

Tarascon J. M., et al."Issues and challenges facing rechargeable lithium batteries" Nature, Nov. 15, 2001, vol. 414, pp. 359-367.

(Continued)

*Primary Examiner* — Melissa S Swain
(74) *Attorney, Agent, or Firm* — Buchanan Ingersoll & Rooney P.C.

(57) ABSTRACT

Here are described methods for the delithiation of carbon-free olivines, for instance, by the addition of an external carbon source in the presence of an oxidizing agent, e.g. a persulfate.

14 Claims, 14 Drawing Sheets

(56) References Cited

U.S. PATENT DOCUMENTS

| | | |
|---|---|---|
| 2004/0033360 A1 | 2/2004 | Armand et al. |
| 2009/0123813 A1* | 5/2009 | Chiang ............... H01M 4/364 429/50 |
| 2010/0015525 A1* | 1/2010 | Isono ................ C01B 25/45 429/209 |
| 2012/0136136 A1 | 5/2012 | Schougaard et al. |
| 2012/0237425 A1* | 9/2012 | Nishio ............... C01B 25/45 423/306 |

FOREIGN PATENT DOCUMENTS

| | | |
|---|---|---|
| WO | 02/27823 A1 | 4/2002 |
| WO | 02/27824 A1 | 4/2002 |

OTHER PUBLICATIONS

Armand M., et al."Building better batteries" Nature, Feb. 7, 2008, vol. 451, pp. 652-657.

Padhi A., et al."Phospho-olivines as Positive-Electrode Materials for Rechargeable Lithium Batteries" J. Electrochem. Soc. Inc., 1997, vol. 144, No. 4, pp. 1188-1194.

Ellis B. L., et al.,"Positive Electrode Materials for Li-Ion and Li-Batteries" Chem. Mater. 2010, vol. 22, No. 3, pp. 691-714.

Hyand H., et al.,"Approaching Theoretical Capacity of LiFePO4 at Room Temperature at High Rates", Electrochemical and Solid-State Letters, vol. 4, Issue 10, 2001, A170-A172.

Zaghib K., et al.,"Review and analysis of nanostructured olivine-based lithium rechargeable batteries: Status and trends" Elsevier, Journal of Power Sources, vol. 232, pp. 357-369.

Wizansky A. R., et al.,"Powerful Oxidizing Agents for the Oxidative Deintercalation of Lithium from Transition-Metal Oxides" J. Solid State Chem., 1989, vol. 81, 203-207.

Delacourt C., et al.,"Toward Understanding of Electrical Limitations (Electronic, Ionic) in LiMPO4 (M=Fe, Mn) Electrode Materials" J. Electrochem. Soc., 2005, vol. 152, No. 5, pages A913-A921.

Andersson A. S., et al.,"Lithium extraction / insertion in LiFePO4 an X-ray diffraction and Mossbauer spectroscopy study" Solid State Ionics, 2000, vol. 130, pp. 41-52.

Amine K., et al.,"High-temperature storage and cycling of C-LiFePO4/ graphite Li-ion cells" Elsevier, Electrochem. Comm., 2005, vol. 7, pp. 669-673.

Dodd J. L.., et al.,"Phase Diagram of LixFePO4" Electrochem. Solid-State Letters., 2006, vol. 9, No. 3, pages A151-A155.

Wang J., et al.,"Understanding and recent development of carbon coating on LiFePO4 cathode materials for lithium-ion batteries" Energy Environ. Sci., 2012, vol. 5, pp. 5163-5185.

Cheng L., et al.,"Low cost synthesis of LiFePO4/C cathode materials with Fe2O3" Elsevier, J. Power Sources, 2013, vol. 242, pp. 656-661.

Zaghib K., et al.,"Study of the Li-insertion/extraction process in LiFePO4/FePO4" Elsevier, J. Power Sources, 2009, vol. 187, pp. 555-564.

Intaranont, et al.,"Selective lithium extraction from brines by chemical reaction with battery materials" Journal of Materials Chemistry A, 2014, vol. 2, No. 18, pp. 6374-6377.

Streltsov V.A., et al.,"Multipole Analysis of the Electron Density in Triphylite, LiFePO4, using X-ray Diffraction Data" Acta Cryst. B, 1993, vol. 49, pp. 147-153.

Yamada A. et al.,"Crystal Chemistry of the Olivine-Type Li(MnyFe1-y)PO4 and (MnyFe1-y)PO4 as Possible 4 V Cathode Materials for Lithium Batteries" J. Electrochem. Soc., 2001, vol. 148, No. 8, pp. A960-A967.

Yang R., et al."Effect of complexing agents on the electrochemical performance of LiFePO4/C prepared by sol-gel method" Nanoscale Research Letters, 2012, vol. 7, No. 40, pp. 1-7.

Porcher W., et al."Is LiFePO4 Stable in Water? Toward Greener Li-Ion Batteries" Electrochemical and Solid-State Letters, 2008, vol. 11, No. 1, pages A4-A8.

Zaghib K., et al."Aging of LiFePO4 upon exposure to H2O" Elsevier, Journal of Power Sources, 2008, vol. 185, pp. 698-710.

Lepage, D, et al."Delithiation kinetics study of carbon coated and carbon free LiFeP04" Elsevier, Journal of Power Souices, vol. 256, 2013, pp. 61-65.

Dodd, J.L. et al."Determining the Phase Diagram of LixFeP04" ECS Transactions, vol. 1 No. 26, 2006, pp. 27-38.

Yi, F. et al."Journal of Alloys and Compounds" Elsevier, Journal of Alloys and Compounds, vol. 617, 2014, pp. 716-721.

International Search Report (PCT/ISA/210) dated Mar. 7, 2018, by the Canadian Patent Office as the International Searching Authority for International Application No. PCT/IB2017/057971.

Written Opinion (PCT/ISA/237) dated Mar. 7, 2018, by the Canadian Patent Office as the International Searching Authority for International Application No. PCT/IB2017/057971.

\* cited by examiner (a) (b)

DELITHIATION OF CARBON FREE OLIVINE BY ADDITION OF CARBON

RELATED APPLICATION

This application claims priority to U.S. provisional application No. 62/434,661 filed on Dec. 15, 2016, the content of which is incorporated herein by reference in its entirety for all purposes.

TECHNICAL FIELD

The technical field generally relates to processes for the delithiation of olivine, more specifically for the delithiation of carbon free olivine by the addition of carbon.

BACKGROUND

In the last decades, batteries have been widely used as Electrical Energy Storage (EES) systems for both portable and stationary applications. Particularly, lithium ion are the most widely used batteries in portable devices and are also currently spreading to the automotive world (J. M. Tarascon and M. Armand, *Nature*, 2001, 414, 359; M. Armand, J. M. Tarascon, *Nature* 2008, 451, 652).

Triphylite (olivine) lithium iron and manganese phosphates, $LiFePO_4$ (LFP) and $LiMnPO_4$ (LMnP or LMP), have been identified as suitable materials for Li-ion batteries (A. Padhi, et al., *J. Electrochem. Soc.* 1997, 144, 1188; B. L. Ellis, et al., *Chem. Mater.* 2010, 22, 691). In particular, LFP is now considered a commercial success since it delivers the highest capacity (=170 mAh $g^{-1}$) in a safe voltage window (H. Hyand, et al., *Electrochem. Solid State Lett.* 2001, A, A170-A171), which presents several features such as low cost, non-toxicity, and high thermal stability (K. Zaghib, et al., *J. Power Sources*, 2013, 232, 357).

Chemical delithiation of $LiFePO_4$ has been widely studied over the last decades. Several oxidizing agents such as $NO_2PF_6$ and $NO_2BF_4$ in acetonitrile under inert atmosphere (A Padhi et al., *Supra*; A. R. Wizansky, et al., *J. Solid State Chem.*, 1989, 81, 203; C. Delacourt, et al., *J. Electrochem. Soc.*, 2005, 152(5) A913) or $Br_2$ (Anna S. Andersson, et al., *Solid State Ionics*, 2000, 130 41) are known to delithiate $LiFePO_4$. However, these reagents cannot be considered environmentally friendly.

Therefore, it is highly desirable to develop an improved process for the production of delithiated olivines.

SUMMARY

According to one aspect, here is described a process for the delithiation of olivine, more specifically the delithiation of carbon free olivine by the addition of carbon in the presence of an oxidizing agent. More specifically, the present technology relates to a process for the delithiation of carbon-free olivine, the process comprising the step of contacting the carbon-free olivine with a source of carbon in the presence of an oxidizing agent to obtain a delithiated olivine.

In one embodiment, the carbon-free olivine is of the formula $LiMPO_4$ where M is Fe, Ni, Mn, Co, or a combination thereof. In another embodiment, the carbon-free olivine is of the formula $LiFe_{(1-x)}M'_xPO_4$ where M' is Ni, Mn, Co, or a combination thereof, and wherein $0 \leq x < 1$, e.g., or M' is Mn and $0 < x < 1$, or x is selected from the range of 0.1 to 0.9, or from the range of 0.2 to 0.8, or from the range of 0.2 to 0.6. In another embodiment, x is 0 (i.e. the olivine is $LiFePO_4$).

In another embodiment, the oxidizing agent is selected from persulfates and peroxides. Preferably, the oxidizing agent is a persulfate, for example potassium or sodium persulfate, e.g. sodium persulfate.

In a further embodiment, the source of carbon is selected from Ketjenblack®, acetylene black such as Denka™ black or Shawinigan Black™, carbon fibers, Super P™ carbon, graphene, graphite, and any mixture thereof. For instance, the weight ratio of carbon source to olivine is between 0.05% and 10%, or between 0.1% and 5%.

In yet another embodiment, the process is carried out in an aqueous solvent, e.g. in water. For instance, the process further comprises adding a surfactant to the reaction mixture. For example, the surfactant is a non-ionic surfactant based on polyethylene glycol.

Other features and advantages of the present technology will be better understood upon reading of the description herein below with reference to the appended drawings.

DETAILED DESCRIPTION

Figure 1:
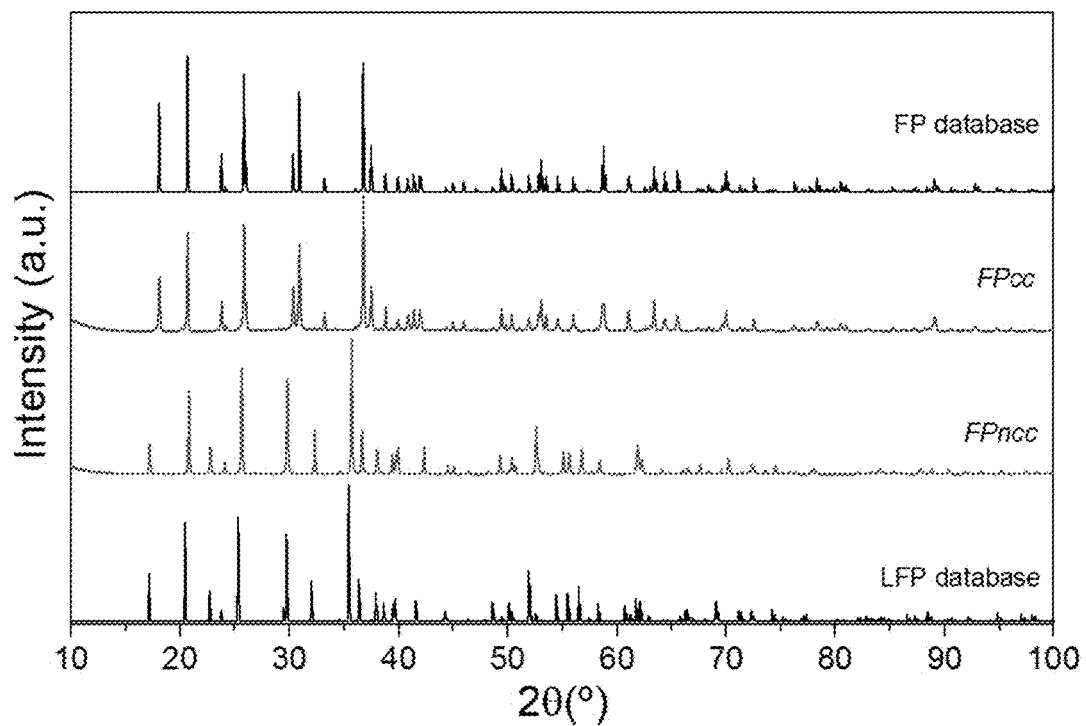
FIG. 1 shows X-ray diffraction patterns for samples FPcc and FPncc obtained after delithiation compared with LFP and FP data from literature according to Comparative Example 1.

Olivine LFP is stable in water. Persulfates like $K_2S_2O_8$ and $Na_2S_2O_8$, which are powerful oxidizing agents, can be used in aqueous media. Moreover, $K_2S_2O_8$ and $Na_2S_2O_8$ are 200 times cheaper than $NO_2BF_4$, which is essential for a cost-competitive delithiation process, especially when used on an industrial production scale.

Since olivines like LFP are generally used as carbon-coated particles given their poor conductivity, the effect of the carbon on delithiation of LFP was evaluated using, for instance, an oxidizing agent such as a persulfate like $K_2S_2O_8$ or $Na_2S_2O_8$. As is shown in Comparative Example 1 below, only carbon coated LFP was successfully delithiated using $Na_2S_2O_8$ in aqueous media.

Delithiation of non-carbon coated LFP using $K_2S_2O_8$ in aqueous media was reported in two publications (K. Amine et al., *Electrochemistry Communications*, 2005, 7, 669 and J. L. Dodd et al., *Electrochemical and Solid-State Letters*, 2006, 9(3) A151-A155). However, in these cases, the upstream preparation of LFP was carried out by solid state synthesis using iron oxalate as an iron source, this method being known to result in a carbon deposition on the particle surface after the synthesis (J. Wang and X. Sun, *Energy Environ. Sci.*, 2012, 5, 5163).

In 2014, D. Lepage et al. (*Journal of Power Sources*, 2014, 256, 61) reported the use of hydrogen peroxide ($H_2O_2$) in acetic acid as an oxidizing agent for carrying out successful delithiation of commercial non-carbon coated and carbon coated $LiFePO_4$ obtained by a hydrothermal method. This conclusion is however not in agreement with what is observed herein, although the synthetic method used possibly involved generation of carbon from a precursor. In their publication, the authors mentioned that the LFP used was obtained by a hydrothermal method and supplied by Clariant (Canada) inc. (Phostech Lithium Inc) in Saint-Bruno de Montarville (Canada). As the synthesis is not reported on that paper, a paper where a co-author is from Clariant and the University of Montreal as in the D. Lepage et al. paper was located. The LFP synthesis described was conducted by a hydrothermal method using $Fe_2O_3$, $LiH_2PO_4$ and citric acid in the solution. In the first step, $LiFePO_4(OH)$ is obtained (L. Cheng et al., *J. Pow. Sources*, 2013, 242, 656). After a heat treatment at high T in the presence of β-lactose, carbon-coated LFP is obtained. If the calcination step is done without presence of lactose, then it would be supposed to lead to non-carbon coated LFP. However, the presence of citric acid in the early stage will most likely result in the presence of some carbon residue on the LFP particles.

The present technology thus relates to a process for the delithiation of carbon free olivines by the addition of an external carbon source in the presence of an oxidizing agent such as persulfates, to obtain a delithiated olivine. Carbon-free olivine may generally be defined by the formula $LiMPO_4$ where M is Fe, Ni, Mn, Co, or a combination thereof. For example, the olivine is of the formula: $LiFe_{(1-x)}M'_xPO_4$ where M' is Ni, Mn, Co, or a combination thereof, and wherein 0≤x<1, or M' is Mn, and 0<x<1, or x is selected from the range of 0.1 to 0.9, or from the range of 0.2 to 0.8, or from the range of 0.2 to 0.6. One example of an olivine is $LiFePO_4$ (LFP).

Various oxidizing agents may be used, for instance persulfates and peroxides. Preferably, the oxidizing agent is a persulfate, e.g. $K_2S_2O_8$ or $Na_2S_2O_8$, preferably $Na_2S_2O_8$. The amount of oxidizing agent is adjusted according to the stoichiometry of the reaction. For instance, one molecule of persulfate being required to oxidize two iron atoms from Fe(II) to Fe(II), a molar ratio olivine:persulfate of about 2:1 may be used.

According to the results described herein, the source of carbon to be added to the olivine may be selected from any known conductive carbon regardless of its porosity or its solid state, for instance, the carbon source may be selected from carbon blacks such as Ketjen Black®, Super P™ carbon, and acetylene black (e.g. Denka™ black, Shawinigan Black™), carbon fibers (e.g. VGCF), carbon nanotubes, graphene, graphite, or any mixture thereof. The amount of carbon added to the olivine may be very low as only a small amount is required to catalyse the delithiation step. For example, the weight percentage of carbon added to the reaction mixture is between 0.01% and 15%, or between 0.05% and 10%, or between 0.1% and 5%, with respect to the weight of olivine used.

The process may be carried, for instance, in any water-containing solvent (i.e. aqueous solvent). Preferably, the process is achieved in water as a solvent. A surfactant may also be added to the composition to allow for a better dispersion of the carbon source in water. Examples of surfactants are known to the art and include non-ionic surfactants based on polyethylene glycol (also called ethoxylates, e.g. fatty alcohol, alkylphenol and fatty acid ethoxylates), for example, an alkylphenol ethoxylate surfactant such as Triton™ X-100 (i.e. $C_8H_{17}C_6H_4(OC_2H_4)_{9-10}OH$).

EXAMPLES

The following non-limiting examples are illustrative embodiments and should not be construed as further limiting the scope of the present disclosure.

Comparative Example 1

The experiments were performed using commercial non-carbon coated and carbon coated $LiFePO_4$ (LFP) supplied by IREQ (Varennes, Canada) which are labeled LFPncc for the non-carbon coated (carbon free LFP) and LFPcc for the carbon coated. The delithiation of LFP was done following the work of Zaghib et al. (*Journal of Power Sources*, 2009, 187, 555) and the updated work done by Intaranont, et al. (*Journal of Materials Chemistry A*, 2014, 2(18), 6374).

First, non-carbon coated or carbon coated LFP (named LFPncc and LFPcc, respectively) and $Na_2S_2O_8$ (Sigma- Aldrich, 98%) were mixed with deionized water in a 2:1 molar ratio according to the following reaction:

$$2LiFePO_4 + Na_2S_2O_8 \leftrightarrow FePO_4 + Li_2SO_4 + Na_2SO_4 \quad \text{Equation 1}$$

Then, the solution was kept under stirring at room temperature for 24 hours. The color of the final solution was green for non-carbon coated LFP and black for carbon coated LFP. After 24 hours, the precipitate was centrifuged, washed with deionized water and dried overnight at 60-75° C.

FIG. 1 shows the XRD patterns of the compounds after delithiation. As can be seen in this figure, delithiation could only be achieved with carbon coated LFP, thereby resulting in the preparation of $FePO_4$ (FPcc). On the contrary, the non-carbon coated sample although named FPncc (to follow the same systematic nomenclature throughout the present disclosure) still shows the characteristic diffraction peaks of olivine LFP. This is confirmed from the refined unit cell parameters, determined with a Le Bail refinement, which are shown in Table 1 together with literature values.

TABLE 1

Refined unit cell parameters of compounds obtained after delithiation and comparison with reported values for $LiFePO_4$ and $FePO_4$.

| | a (Å) | b (Å) | c (Å) |
|---|---|---|---|
| $FePO_4$ reference[a] | 9.8142(2) | 5.7893(2) | 4.7820(2) |
| FPcc | 9.8142(3) | 5.7896(2) | 4.7819(2) |
| FPncc | 10.3178(2) | 6.0008(1) | 4.6931(1) |
| $LiFePO_4$ reference[b] | 10.332(4) | 6.010(5) | 4.692(2) |

[a]D. Lepage et al., *Journal of Power Sources*, 2014, 256, 61.
[b]V. A. Streltsov et al., *Acta Cryst. B*, 1993, 49, 147.

Figure 2:
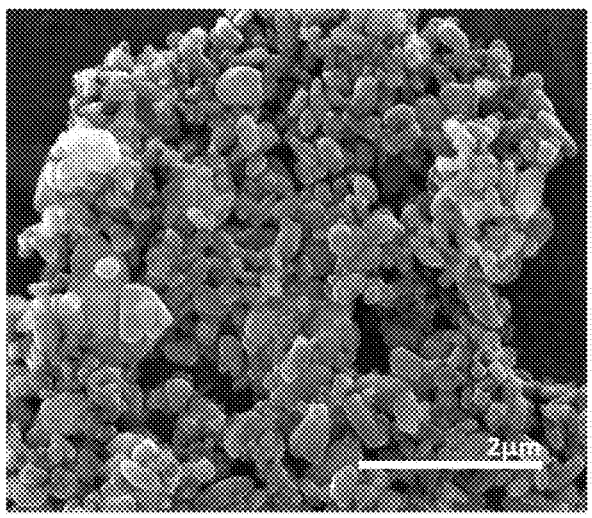
FIG. 2 shows SEM image for (a) LFPcc starting material and (b) FPcc obtained after delithiation according to Comparative Example 1.
Figure 2:
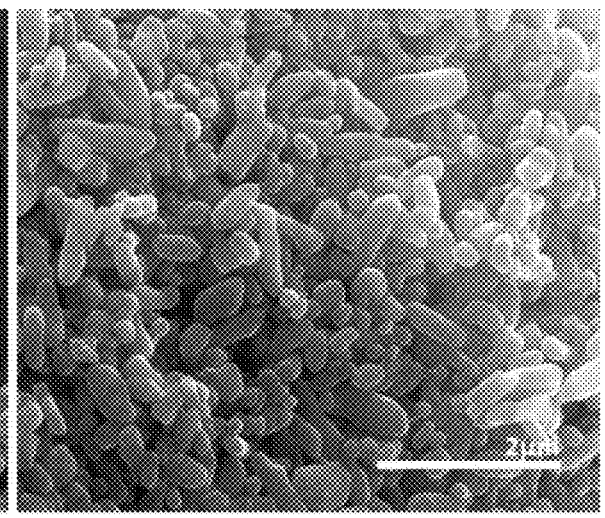

As only LFPcc leads to successful delithiation, morphological studies through electron microscopy were only carried out for this sample. The homogeneity degree and particle size of the coated LFPcc and FPcc obtained after delithiation are shown in FIGS. 2(a) and (b), respectively. This experiment shows that the carbon plays a role in achieving successful delithiation of LFP.

Example 1: Ketjen Black® (5 wt %)

In a first test, 5.21 g $Na_2S_2O_8$ (Sigma-Aldrich, 98%) were dissolved in 250 mL of deionized water (colorless solution). After dissolution, 6.7 g of LFPncc were added into the solution according to Equation 1 and the mixture was stirred until a homogenized solution was obtained. Then, Ketjen Black® (0.337 g) was added into the solution as well as two drops of Triton™ X-100 (Sigma-Aldrich) as surfactant, which helps dispersing carbon in the solution. Then, the solution was kept under stirring at room temperature for 24 hours and a darker solution was obtained. Then, the solution was centrifuged and washed with deionized water, and then the precipitate was dried overnight at 60-75° C. The raw LFPncc powder and the final FP obtained (in this report called FPnccKBsol) were compared.

In a second test, 4.21 g $Na_2S_2O_8$ (Sigma-Aldrich, 98%) were dissolved in 200 mL of deionized water. Then, 5.7 g of LFPncc and 0.3 g of Ketjen Black® was mixed for 30 minutes using a high-energy ball milling SPEX®. After that, the homogeneous mixture (LFPncc+Ketjen Black®) was added to the solution of $Na_2S_2O_8$ and was kept under stirring at room temperature for 24 hours. Then, the solution was centrifuged and washed with deionized water, and the precipitate obtained was dried overnight at 60-75° C. The raw powder LFPncc and the final FP obtained (in this report called FPnccKBspex) were compared.

Comparing both FP obtained (FPnccKBsol and FPnccKBspex, respectively), it can be observed that the second one has a darker color. This fact could be attributed to the use of SPEX® for mixing LFPncc and Ketjen Black®, where the carbon could have been mechanically coated on the surface of the LFPncc particles.

Figure 3:
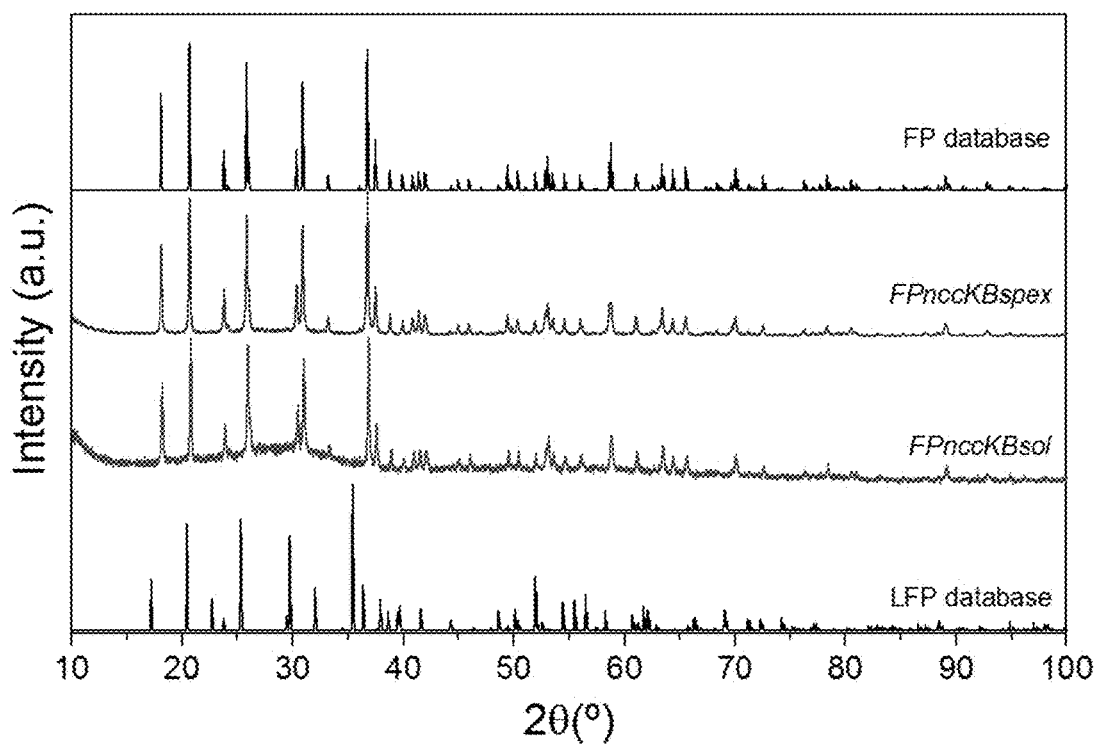
FIG. 3 shows X-Ray diffraction patterns obtained for FPnccKBsol and FPnccKBspex obtained in Example 1 compared with LFP and FP data from literature.

X-Ray diffraction was used for structural characterization and phase identification. FIG. 3 shows the X-Ray diffraction patterns obtained for both compounds FPnccKBsol and FPnccKBspex, which have been compared with LFP and FP data from literature. In addition, these patterns have been refined using the Le Bail method to determine the unit cell parameters of both compounds, reported in Table 2, and that correspond to $FePO_4$.

TABLE 2

Refined unit cell parameters of compounds obtained after delithiation using Ketjen black ® and references for $LiFePO_4$ and $FePO_4$.

| | a (Å) | b (Å) | c (Å) |
|---|---|---|---|
| $FePO_4$ reference[a] | 9.8142(2) | 5.7893(2) | 4.7820(2) |
| FPnccKBsol | 9.8157(4) | 5.7935(2) | 4.7841(2) |
| FPnccKBspex | 9.8125(4) | 5.7925(2) | 4.7831(2) |
| $LiFePO_4$ reference[b] | 10.332(4) | 6.010(5) | 4.692(2) |

[a]D. Lepage et al., *Journal of Power Sources*, 2014, 256, 61.
[b]V. A. Streltsov et al., *Acta Cryst. B*, 1993, 49, 147.

Figure 4:
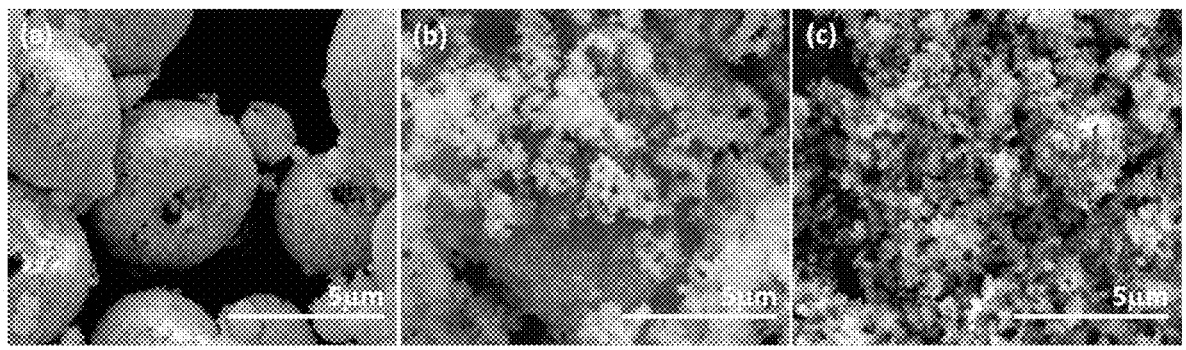
FIG. 4 shows SEM images for (a) the raw material LFPncc; (b) FPnccKBsol; and (c) FPnccKBspex from Example 1.

FIG. 4 shows SEM images for both FP (FPnccKBsol and FPnccKBspex) obtained after the delitiation process, which present the same particle size than the raw material (LFPncc, FIG. 4(a)). For the FPnccKBsol, the image reveals a random distribution of Ketjen Black® between aggregates (FIG. 4(b), carbon highlighted). On the other hand, FPnccKBspex (FIG. 4(c)) does not show this feature because the carbon and LFPncc were ball milled together.

Example 2: Denka™ Carbon (5 wt %)

$Na_2S_2O_8$ (5.1994 g, Sigma-Aldrich, 98%) was dissolved in 250 mL of deionized water and LFPncc (7.0207 g) was added into the solution according to Equation 1. The resulting mixture was stirred until a homogenized solution was obtained. Then, 0.3567 g of Denka™ carbon was added into the solution. Two drops of Triton™ X-100 (Sigma-Aldrich) as a surfactant were also added to the mixture to help dispersing the carbon powder in the solution. Then, the mixture was kept under stirring at room temperature for 24 hours; and a darker solution was obtained. The solution was centrifuged and washed with deionized water and the precipitate was dried overnight at 60-75° C. A grey powder called FPnccDk was obtained.

Figure 5:
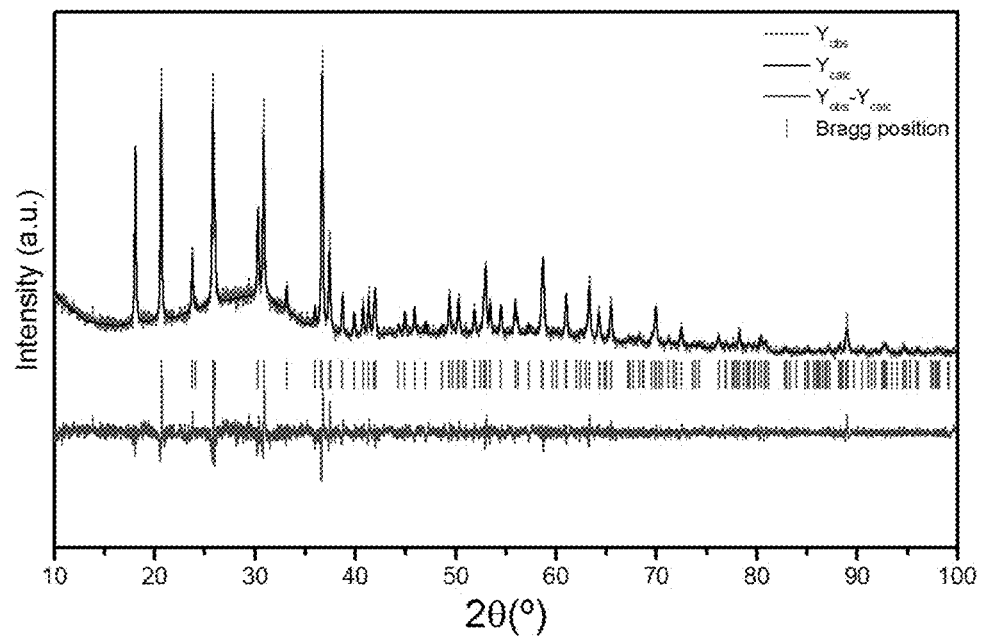
FIG. 5 shows the Le Bail profile matching for FPnccDk from Example 2.

X-Ray diffraction was used for structural characterization and phase identification. FIG. 5 shows a Le Bail refinement which reveals that the compound crystallized with the characteristic orthorhombic olivine phase (Pnma). The unit cell parameters determined were a=9.8189(5) Å, b=5.7967 (3) Å and c=4.7880(2) Å, which are in agreement with those reported for FP (see Table 3 below).

Figure 6:
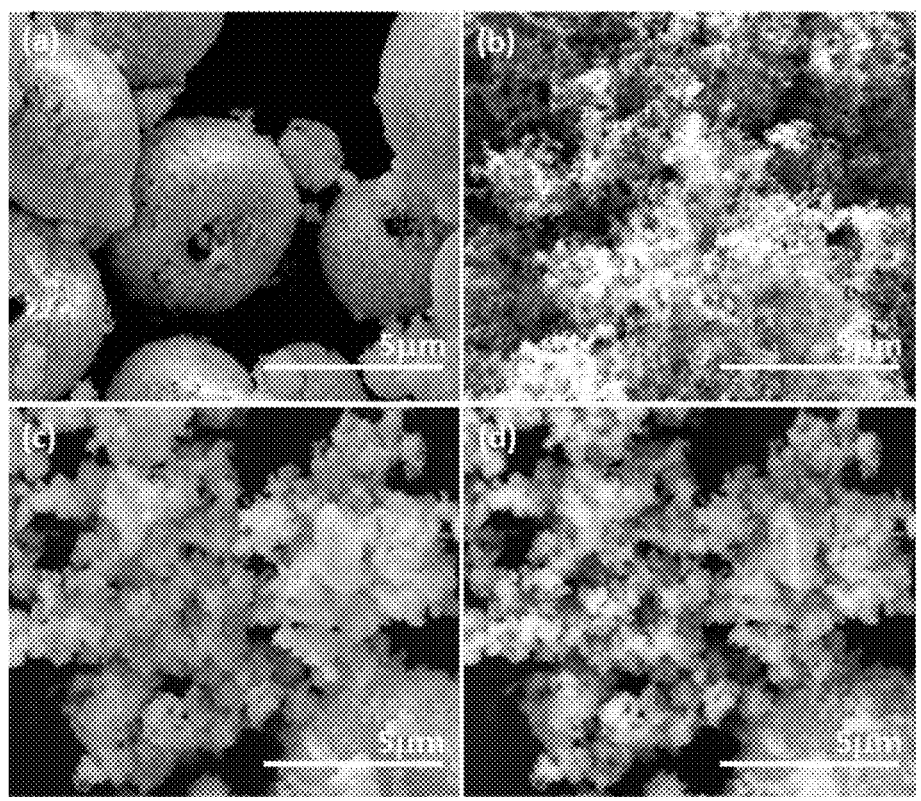
FIG. 6 shows SEM images of (a) LFPncc; (b)-(c) FPnccDk; and (d) a BSED image of (c), all from Example 2.

Particle size and morphological studies were carried out using scanning electron microscopy (SEM). Both materials (LFP and FP) showed good homogeneity, but also the presence of agglomerates of small particles. LFPncc presents spherical-shaped aggregates (FIG. 6(a)), whereas the spherical-shaped aggregates are broken in FPnccDk (FIGS.

6(b) and 6(c)). However, the particle size in both materials is in the same nanometric range. A backscattered electron detector (BSED) was used to detect contrast between areas with different chemical compositions, in this case between FPnccDk and Denka™ carbon. The heaviest elements backscatter electrons more strongly than light elements (in this case Denka™ carbon) showing a brighter contrast in the image (FIG. 6(d)).

Example 3: VGCF (5 wt %)

$Na_2S_2O_8$ (5.2205 g, Sigma-Aldrich, 98%) was dissolved in 250 mL of deionized water and LFPncc (7.054 g) was added to the solution according to Equation 1. The resulting mixture was stirred until a homogenized solution was obtained. Then, 0.3587 g of VGCF was added into the solution as well as two drops of Triton™ X-100 (Sigma-Aldrich) as a surfactant. The solution was kept under stirring at room temperature for 24 hours, after which time the solution became darker. After that, the solution was centrifuged and washed with deionized water and the precipitate was dried overnight at 60-75° C. A grey powder called FPnccVGCF was obtained.

Figure 7:
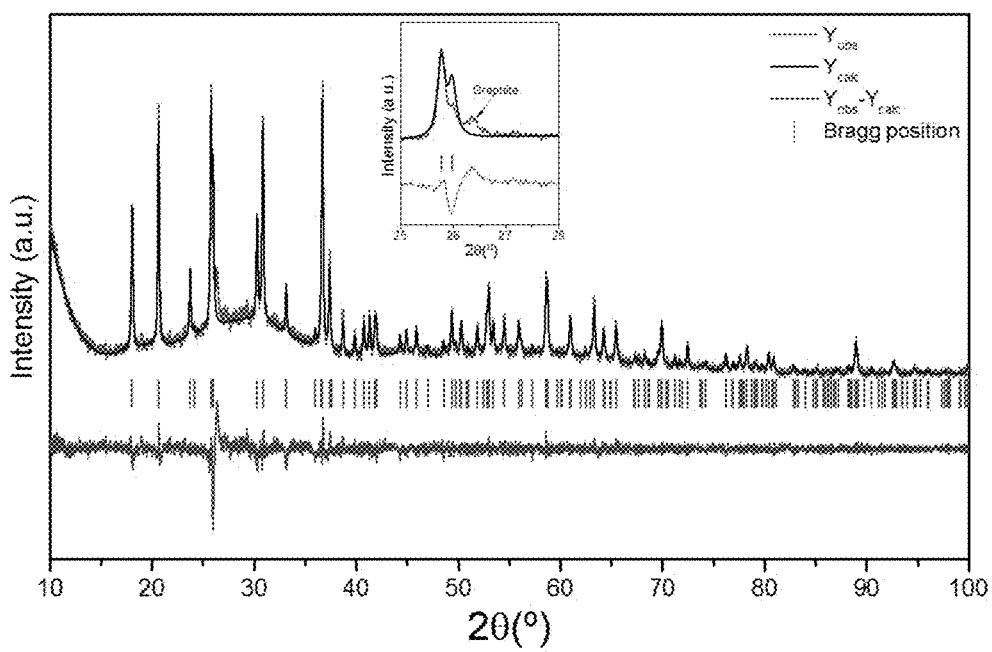
FIG. 7 shows the Le Bail profile matching for FPnccVGCF from Example 3.

The structural characterization and phase identification were carried out using X-Ray diffraction. The Le Bail refinement revealed that the compound crystallized in the orthorhombic olivine phase (Pnma) with a=9.8176(6) Å, b=5.7946(3) Å and c=4.7863(3) Å as unit cell parameters (FIG. 7 and Table 3 below), which indicate that the delithiation was complete. An extra peak around 26.5° is attributed to graphite (see inset FIG. 7).

Figure 8:
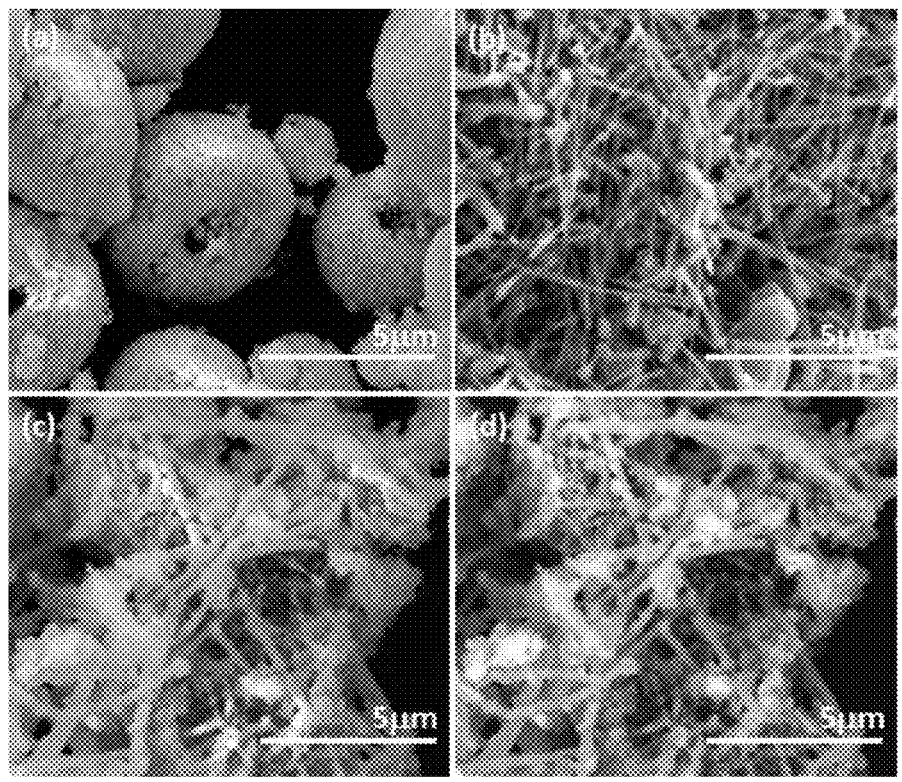
FIG. 8 shows SEM images of (a) LFPncc; (b)-(c) FPnccVGCF; and (d) BSED image of (c), all from Example 3.

In addition, scanning electron microscopy was used to determine morphological features and particle size. LFPncc presents spherical-shaped aggregates (FIG. 8(a)) which seem to be broken in FPnccVGCF (FIG. 8(b)). Nanofibers due to VGCF can also be observed (FIG. 8(c)). Raw material (LFPncc) and FPnccVGCF exhibit a particle size in the same nanometric range. FIG. 8(d) is the BSED image corresponding to FIG. 8(c), which shows the contrast between areas with different chemical compositions, in this case between FPnccVGCF and VGCF (fibers).

Example 4: Super P™ Carbon (5 wt %)

$Na_2S_2O_8$ (5.2215 g, Sigma-Aldrich, 98%) were dissolved in 250 mL of deionized water and LFPncc (7.0526 g) was added to the solution according to Equation 1. The mixture was stirred until a homogenized solution was obtained. Then, 0.3582 g of Super P™ carbon was added to the solution. Two drops of Triton™ X-100 (Sigma-Aldrich) as a surfactant were also added into the mixture to achieve good dispersion of carbon in the solution. The mixture was kept under stirring at room temperature for 24 hours; a darker solution was obtained. The solution was centrifuged and washed with deionized water and then the precipitate was dried overnight at 60-75° C. A dark grey powder called FPnccSP was obtained.

Figure 9:
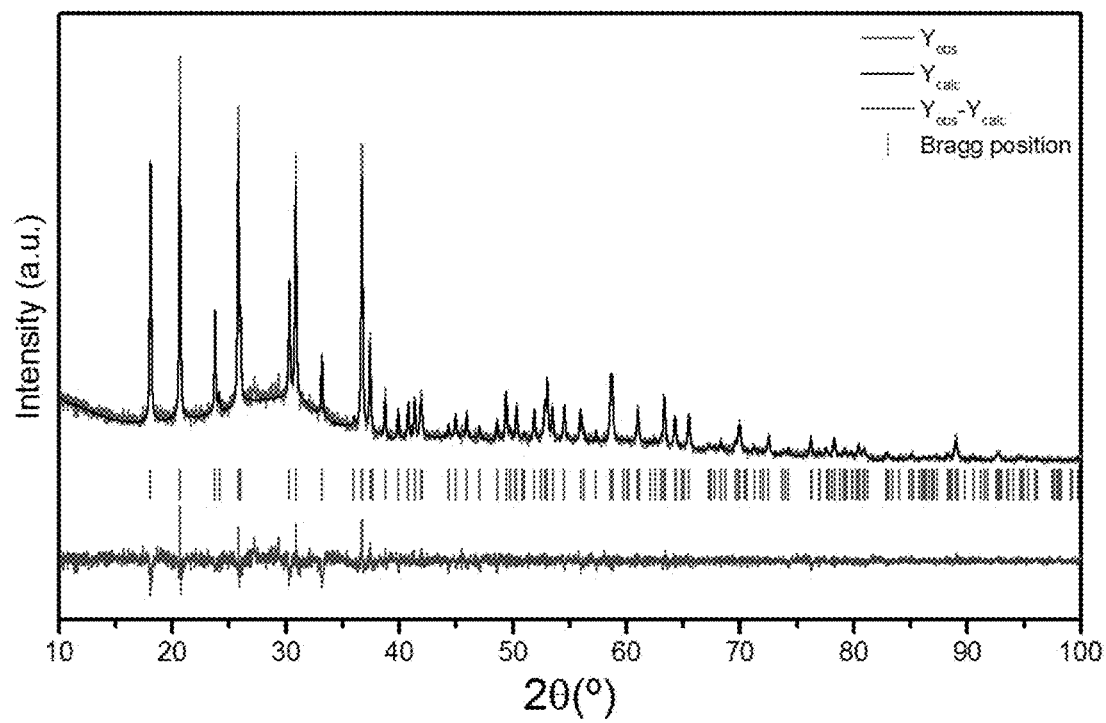
FIG. 9 shows the Le Bail profile matching for FPnccSP from Example 4.

The structural characterization was carried out using X-Ray. FIG. 9 shows a Le Bail refinement of the compound obtained after delithiation. The XRD pattern reveals that the compound crystallized in the characteristic orthorhombic olivine phase (Pnma) and the unit cell parameters determined were a=9.8146(3) Å, b=5.7938(2) Å and c=4.7833(2) Å, in agreement with those reported for FP (see Table 3 below).

Figure 10:
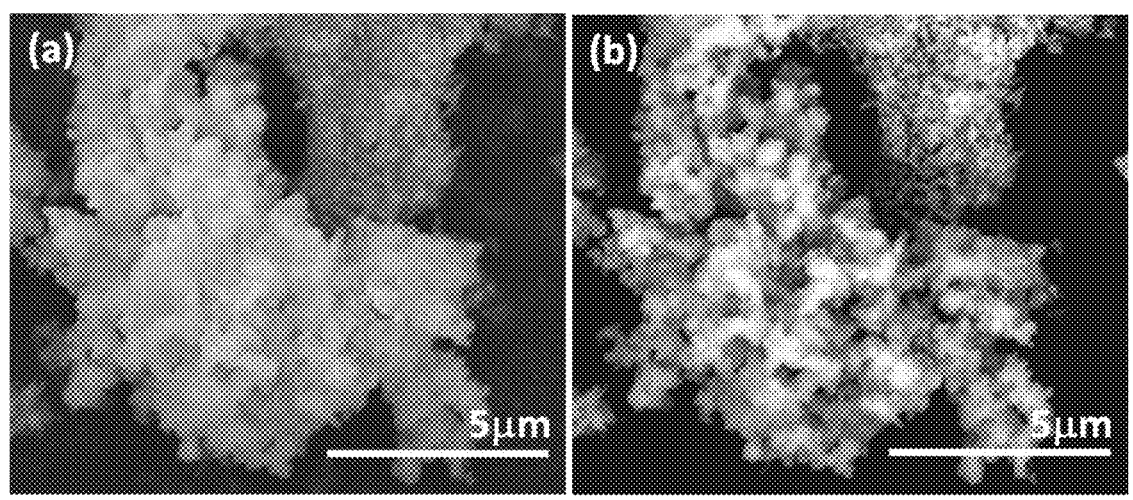
FIG. 10 shows SEM images of (a) FPnccSP; and (b) BSED image of (a), obtained in Example 4.

FIG. 10(a) shows an SEM image of the compound obtained after delithiation. FPnccSP exhibits a good degree of homogeneity and the particle size is in the same range than the raw material (LFPncc, see FIG. 8(a)). FIG. 10(b) is the BSED image corresponding to FIG. 10(a). The BSED analysis was performed in order to observe differences between areas with different chemical compositions; the heaviest elements (FPnccSP) appear brighter in the image whereas the lightest element (Super P™) appears in the darker region.

Example 5: Graphite (5 wt %)

$Na_2S_2O_8$ (5.2297 g, Sigma-Aldrich, 98%) was dissolved in 250 mL of deionized water and LFPncc (7.0206 g) was added to the solution according to Equation 1. The mixture was stirred until a homogeneous solution was obtained. Then, 0.3360 g of graphite was added to the solution. Two drops of Triton™ X-100 (Sigma-Aldrich) as a surfactant were also added to obtain a good dispersion of carbon in the solution. The mixture was kept under stirring at room temperature for 24 hours, and a darker solution was obtained. The solution was then centrifuged and washed with deionized water and the precipitate was dried overnight at 60-75° C. Finally, a green powder called FPnccGrpht was obtained.

Figure 11:
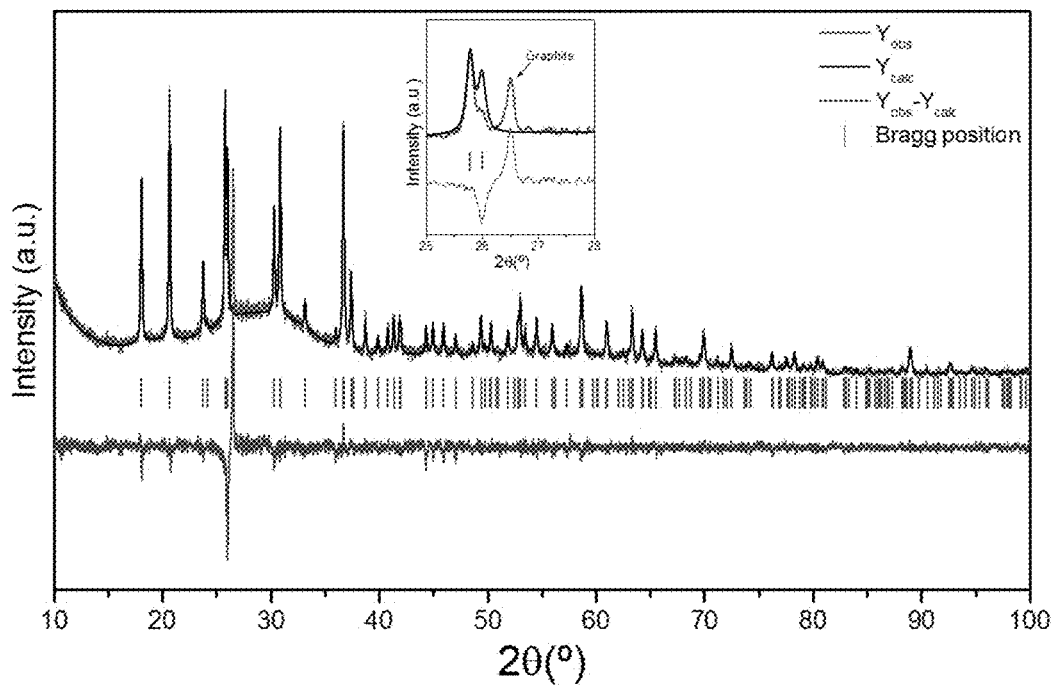
FIG. 11 shows the Le Bail profile matching for FPnccGrpht from Example 5.

X-Ray diffraction measurement was used for structural characterization and phase identification. FIG. 11 shows a Le Bail refinement of the compound obtained after delithiation. The XRD pattern reveals that the compound crystallized in the characteristic orthorhombic olivine phase (Pnma). The unit cell parameters determined were a=9.8143(9) Å, b=5.7946(5) Å and c=4.7843(5) Å, which are in agreement with the reported ones for FP (see Table 3 below). An extra peak around 26.5° is attributed to graphite (see inset FIG. 11).

Figure 12:
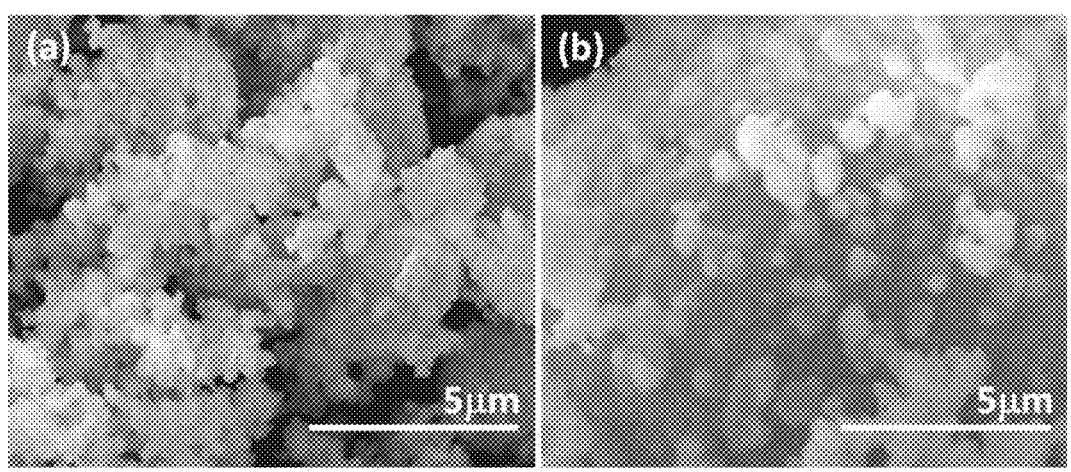
FIGS. 12(*a*) and (*b*) show SEM images of FPnccGrpht obtained in Example 5.

FIG. 12 corresponds to SEM images of the compound obtained after delithiation of LFPncc using graphite. As in previous examples, the sample exhibits a good degree of homogeneity and presents spherical-shaped aggregates.

Example 6: Graphene/VGCF (2.5:2.5 wt %)

$Na_2S_2O_8$ (5.2256 g, Sigma-Aldrich, 98%) was dissolved in 250 mL of deionized water and LFPncc (7.0538 g) was added into the solution according to equation 1. The mixture was stirred until a homogenized solution was obtained. Then, 0.3559 g of a mixture of graphene/VGCF (50:50) was added to the solution. Two drops of Triton™ X-100 (Sigma-Aldrich) as a surfactant were also added into the mixture for a good dispersion of carbon in the solution and better homogeneity. The mixture was then stirred at room temperature for 24 hours, and a darker solution was obtained. The mixture was centrifuged and washed with deionized water and the precipitate was dried overnight at 60-75° C. A green powder called FPnccGrphnVGCF was obtained.

Figure 13:
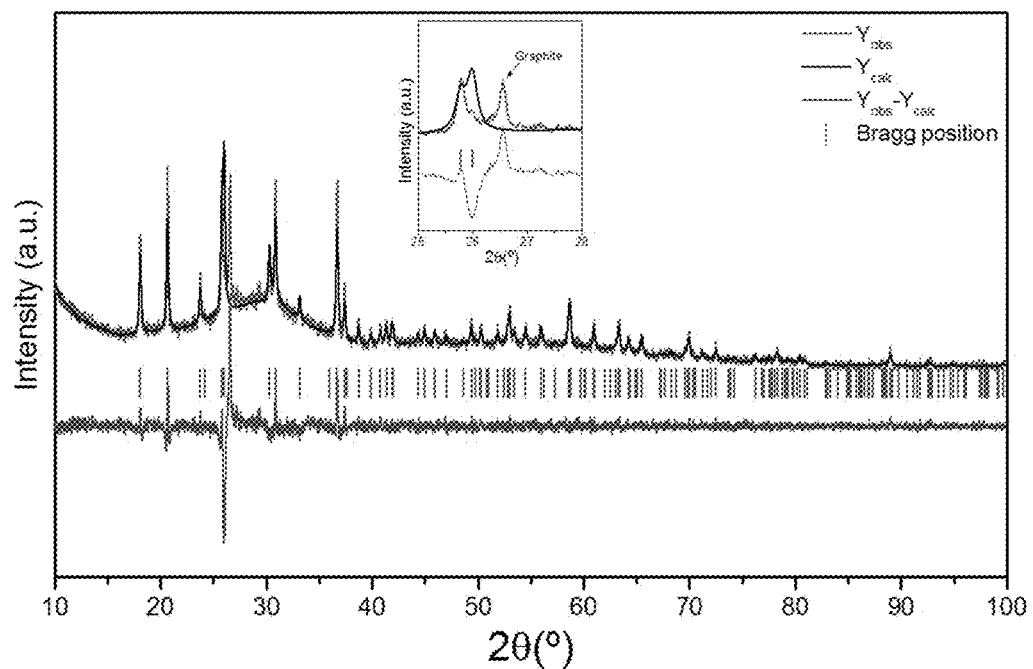
FIG. 13 shows the Le Bail profile matching for FPnccGrphnVGCF from Example 6.

X-Ray diffraction measurement was used for structural characterization and phase identification. FIG. 13 shows a Le Bail refinement of the compound obtained after delithiation. The pattern reveals that the compound crystallized with the characteristic orthorhombic olivine phase (Pnma). The unit cell parameters determined were a=9.815(2) Å, b=5.795(1) Å and c=4.785(1) Å, in agreement with those reported for FP (see Table 3 below). An extra peak around 26.5° is attributed to graphite (see inset FIG. 13).

Figure 14:
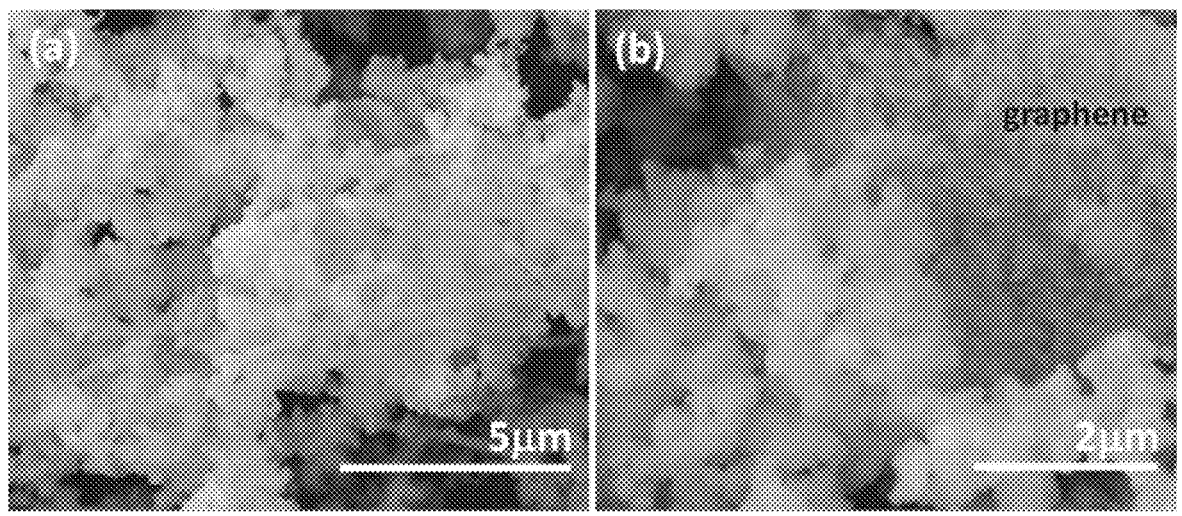
FIGS. 14(*a*) and (*b*) show SEM images of FPnccGrphnVGCF obtained in Example 6.

FIG. 14 shows two SEM images of the FPnccGrphnVGCF obtained after delithiation. The sample presents good homogeneity and exhibits a particle size in the same nanometric range than the precursor LFPncc (FIG.

8(*a*)). In both images, VGCF fibers (FIG. 14(*a*)) and graphene (FIG. 14(*b*)) can also be observed.

Example 7: Graphite/Ketjen Black® (2.5:2.5 wt %)

$Na_2S_2O_8$ (5.2296 g, Sigma-Aldrich, 98%) were dissolved in 250 mL of deionized water and LFPncc (7.0388 g) was added to the solution according to Equation 1. The mixture was stirred until a homogeneous solution was obtained. Then, 0.17749 g of graphite and 0.1786 g of Ketjen Black® (mixture 50:50) were added to the solution. Two drops of Triton™ X-100 (Sigma-Aldrich) as a surfactant were also added into the solution to get a good dispersion of carbon in the solution. Then, the solution was stirred at room temperature for 24 hours; and a darker solution was obtained. The solution was centrifuged and washed with deionized water and the precipitate was dried overnight at 60-75° C. A grey powder called FPnccGrphtKb was obtained.

Figure 15:
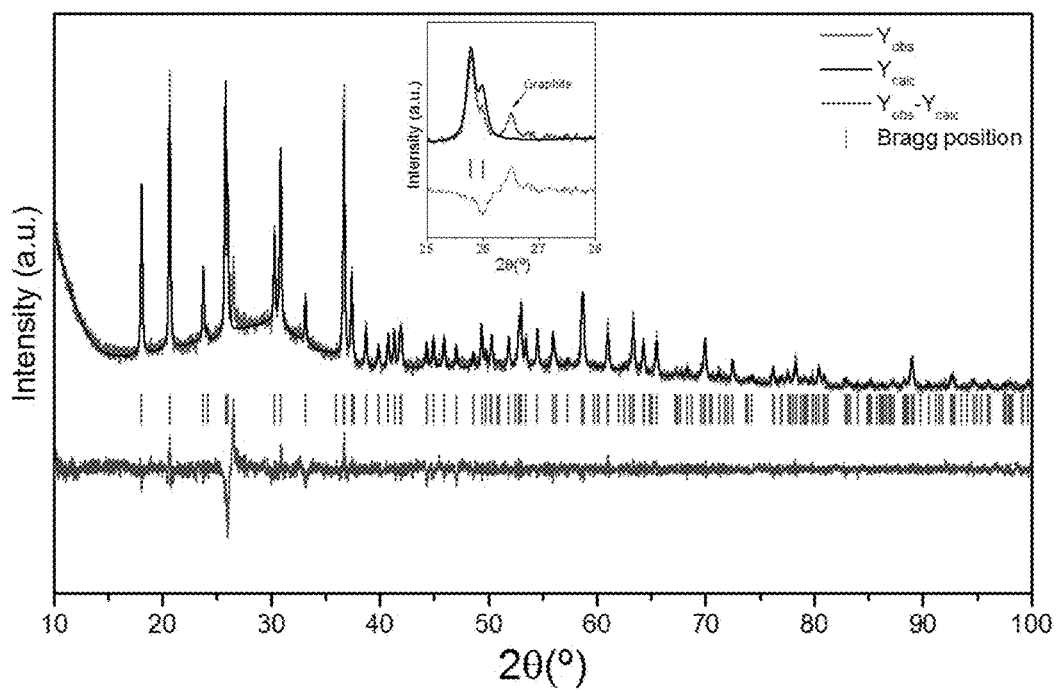
FIG. 15 shows the Le Bail profile matching for FPnccGrphtKb from Example 7.

X-Ray diffraction measurement was used for structural characterization and phase identification. FIG. 15 shows a Le Bail profile matching of the compound obtained after delithiation. The XRD pattern reveals that the compound crystallized with the characteristic orthorhombic olivine phase (Pnma) and the unit cell parameters determined were a=9.8150(6) Å, b=5.7937(4) Å and c=4.7843(3) Å, in agreement with those reported for FP (see Table 3 below). An extra peak around 26.5° was attributed to graphite (see inset FIG. 15).

Figure 16:
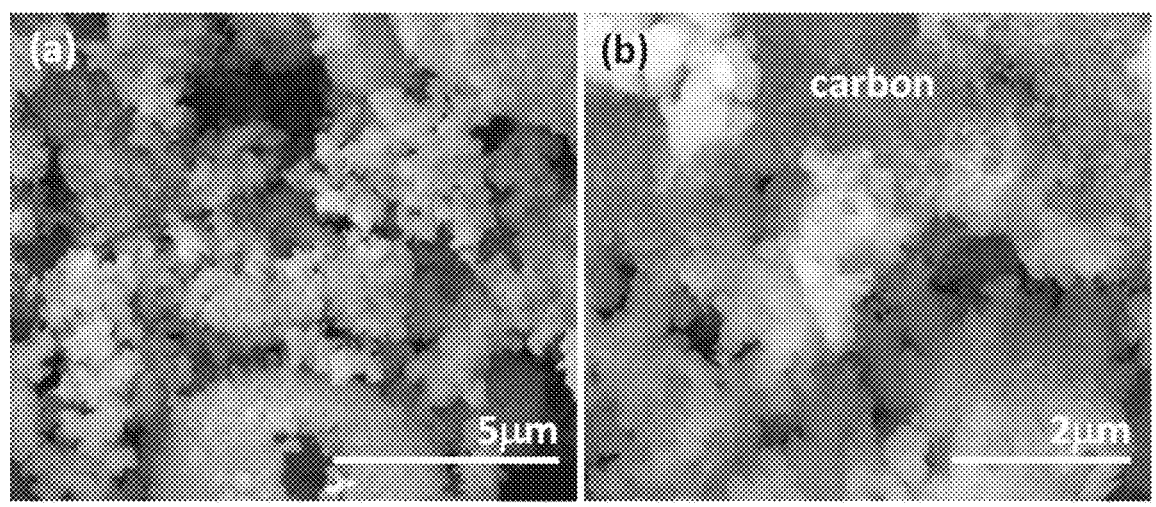
FIGS. 16(*a*) and (*b*) show SEM images of FPnccGrphtKb obtained in Example 7.

Scanning electron microscopy was used to determine morphological features and particle size (FIG. 16). FPnccGrphtKb shows a good homogeneity and exhibits particle size in the same nanometric range than the precursor (LFPncc, FIG. 8(*a*)). In FIG. 16(*b*), some region with carbon can also be observed.

Example 8: Graphite/Denka™ (2.5:2.5 wt %)

$Na_2S_2O_8$ (5.2307 g, Sigma-Aldrich, 98%) was dissolved in 250 mL of deionized water and LFPncc (7.0290 g) were added to the solution according to Equation 1. The mixture was stirred until a homogenized solution was obtained. Then, 0.1837 g of graphite and 0.1774 g of Denka™ carbon (mixture 50:50) were added to the solution. Two drops of Triton™ X-100 (Sigma-Aldrich) as a surfactant were also added for a good dispersion of carbon. The mixture was stirred at room temperature for 24 hours, and a darker solution was obtained. The solution was centrifuged and washed with deionized water and the precipitate was dried overnight at 60-75° C. A grey powder called FPnccGrphtDK was obtained.

Figure 17:
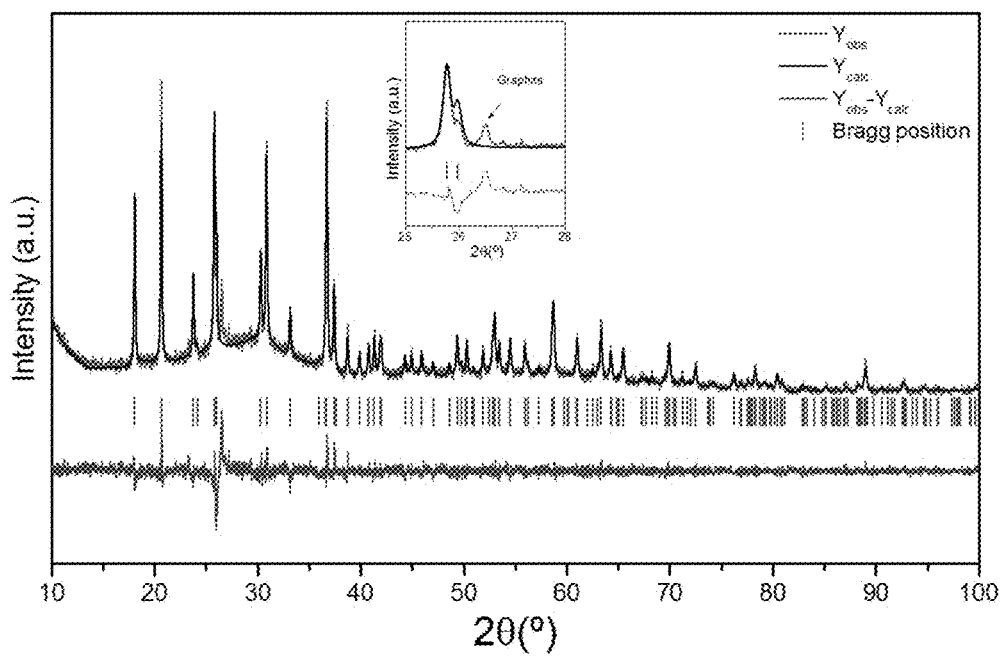
FIG. 17 shows the Le Bail profile matching for FPnccGrphtDk from Example 8.

The structural characterization was carried out using X-Ray. FIG. 17 shows a Le Bail profile matching of the compound obtained after delithiation. The XRD pattern reveals that the compound crystallized in a characteristic orthorhombic olivine phase (Pnma) and the unit cell parameters determined were a=9.8163(6) Å, b=5.7948(3) Å and c=4.7858(3) Å, which are in agreement with those reported for FP (see Table 3 below). An extra peak around 26.5° is attributed to graphite (see inset FIG. 17).

Figure 18:
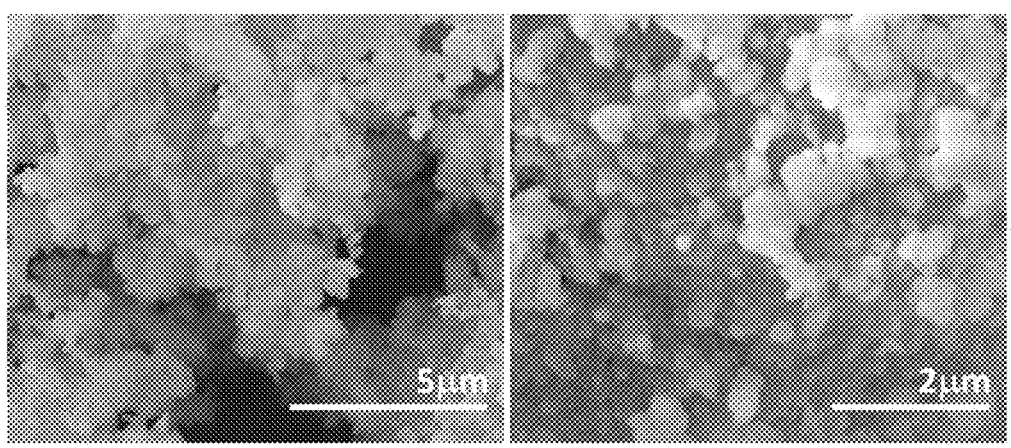
FIG. 18 shows SEM images of FPnccGrphtDk obtained in Example 8.

FIG. 18 shows two SEM images of the FPnccGrphtDk obtained after delithiation. The sample presents good homogenity and exhibits a particle size within the same nanometric range than the precursor LFPncc (FIG. 8(*a*)).

Example 9: Graphite/Super P™ (2.5:2.5 wt %)

$Na_2S_2O_8$ (5.2379 g, Sigma-Aldrich, 98%) was dissolved in 250 mL of deionized water. LFPncc (7.0244 g) was added to the solution according to Equation 1 and the mixture was stirred until a homogenized solution was obtained. Then, 0.1758 g of graphite and 0.1752 g of Super P™ (mixture 50:50) were added to the solution. Two drops of Triton™ X-100 (Sigma-Aldrich) were also added as a surfactant to achieve good carbon dispersion. The mixture was stirred at room temperature for 24 hours; and a darker solution was obtained. After that, the solution was centrifuged and washed with deionized water and the precipitate was dried overnight at 60-75° C. A grey powder called FPnccGrphtSP was obtained.

Figure 19:
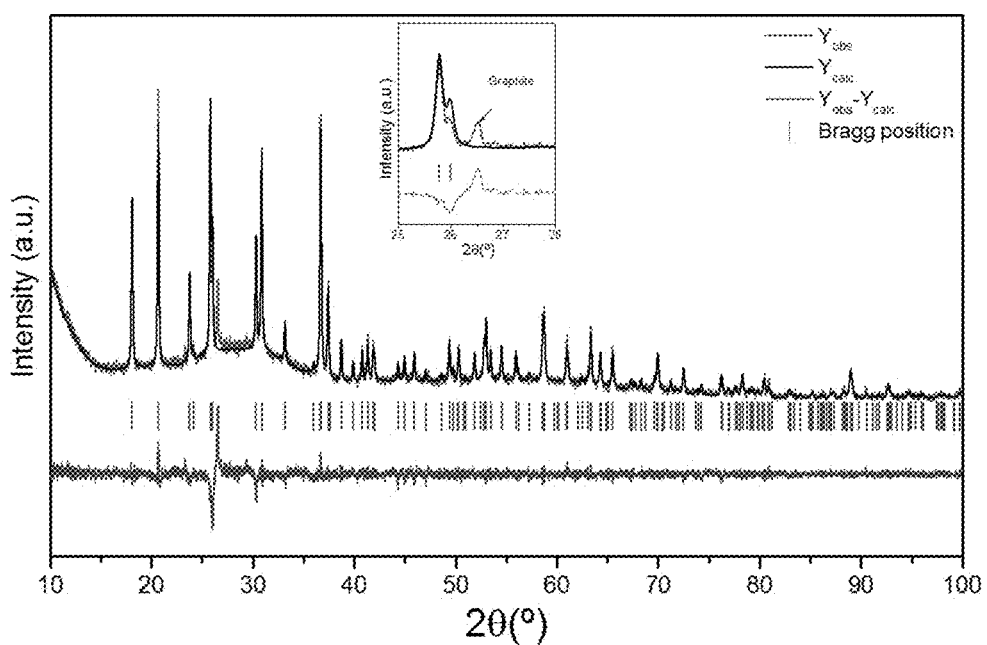
FIG. 19 shows the Le Bail profile matching for FPnccGrphtSP from Example 9.

The structural characterization was carried out by X-Ray diffraction measurements. FIG. 19 shows a Le Bail profile matching of the compound obtained after delithiation. The XRD pattern reveals that the compound crystallized in the characteristic orthorhombic olivine phase (Pnma) and the unit cell parameters determined were a=9.8146(5) Å, b=5.7935(3) Å and c=4.7838(3) Å, in agreement with those reported for FP (see Table 3 below). An extra peak around 26.5° is attributed to graphite (see inset FIG. 19).

Figure 20:
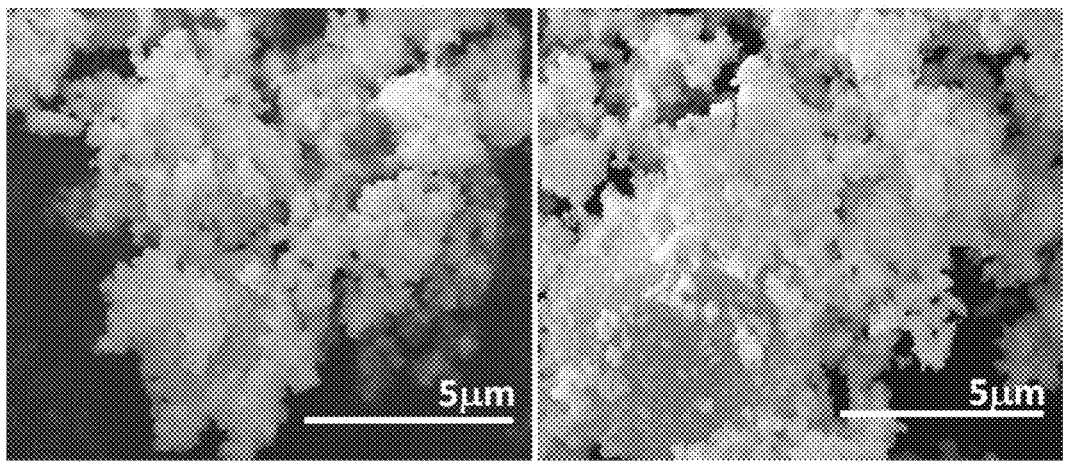
FIG. 20 shows SEM images of FPnccGrphtSP obtained in Example 9.

SEM images of FPnccGrphtSP obtained after delithiation can be seen in FIG. 20. This sample exhibits a good degree of homogenity as well as a particle size within the same nanometric range as the precursor LFPncc (FIG. 8(*a*)).

TABLE 3

Summary of the unit cell parameters refined by profile matching of the samples obtained after the delithiation process (Examples 1-9).

| Ex | Sample | a (Å) | b (Å) | c (Å) |
|---|---|---|---|---|
| Ref. | FePO$_4$ reference[a] | 9.8142(2) | 5.7893(2) | 4.7820(2) |
| 1 | FPnccKBsol | 9.8157(4) | 5.7935(2) | 4.7841(2) |
| 1 | FPnccKBspex | 9.8125(4) | 5.7925(2) | 4.7831(2) |
| 2 | FPnccDk | 9.8189(5) | 5.7967(3) | 4.7880(2) |
| 3 | FPnccVGCF | 9.8176(6) | 5.7946(3) | 4.7863(3) |
| 4 | FPnccSP | 9.8146(3) | 5.7938(2) | 4.7833(2) |
| 5 | FPnccGrpht | 9.8143(9) | 5.7946(5) | 4.7843(5) |
| 6 | FPnccGrphn VGCF | 9.815(2) | 5.795(1) | 4.785(1) |
| 7 | FPnccGrphtKB | 9.8150 (6) | 5.7937(4) | 4.7843(3) |
| 8 | FPnccGrphtDk | 9.8163(6) | 5.7948(3) | 4.7858(3) |
| 9 | FPnccGrphtSP | 9.8146(5) | 5.7935(3) | 4.7838(3) |
| Ref. | LiFePO$_4$ reference[b] | 10.332(4) | 6.010(5) | 4.692(2) |

[a]D. Lepage et al., *Journal of Power Sources*, 2014, 256, 61.
[b]V. A. Streltsov et al., *Acta Cryst. B*, 1993, 49, 147.

Example 10: Effect of Carbon Amount on Delithiation (a) 2.5 wt % of Ketjen Black®

$Na_2S_2O_8$ (5.2072 g, Sigma-Aldrich, 98%) was dissolved in 250 mL of deionized water. LFPncc (7.0342 g) was added to the solution according to equation 1 and the solution was stirred until a homogenized solution was obtained. Then, 0.1729 g of Ketjen Black® was added to the solution. Two drops of Triton™ X-100 (Sigma-Aldrich) as a surfactant were also added into the solution to achieve good carbon dispersion. The mixture was then stirred at room temperature for 24 hours, and a darker solution was obtained. The solution was centrifuged and washed with deionized water and the precipitate was dried overnight at 60-75° C. A green powder called FPnccKbsol25 was obtained.

(b) 1 wt % of Ketjen Black®

$Na_2S_2O_8$ (5.2252 g, Sigma-Aldrich, 98%) was dissolved in 250 mL of deionized water. After that, 7.0249 g of LFPncc were added into the solution according to equation 1 and the mixture was stirred until a homogenized solution was obtained. Then, 0.0710 g of Ketjen Black® was added into the solution. Two drops of Triton™ X-100 (Sigma-Aldrich) as a surfactant were also added to achieve good carbon dispersion. The mixture was then stirred at room temperature for 24 hours, and a darker solution was obtained. The mixture was then centrifuged and washed with deionized water and the precipitate was dried overnight at 60-75° C. A green powder called FPnccKbsol1 was obtained.

(c) 0.5 wt % of Ketjen Black®

$Na_2S_2O_8$ (2.9813 g, Sigma-Aldrich, 98%) was dissolved in 250 mL of deionized water. After that, 4.0205 g of LFPncc were added to the solution according to equation 1 and the mixture was stirred until a homogenized solution was obtained. Then, 0.0201 g of Ketjen Black® was added to the solution. Two drops of Triton™ X-100 (Sigma-Aldrich) as a surfactant were also added to achieve a good dispersion of carbon. The solution was then stirred at room temperature for 24 hours, and a darker solution was obtained. The solution was centrifuged and washed with deionized water and then the precipitate was dried overnight at 60-75° C. A green powder called FPnccKbsol05 was obtained.

(d) 0.1 wt % of Ketjen Black®

$Na_2S_2O_8$ (2.9910 g, Sigma-Aldrich, 98%) was dissolved in 200 mL of deionized water. After that, 4.0078 g of LFPncc were added to the solution according to equation 1 and the mixture was stirred until a homogenized solution was obtained. Then, 0.0043 g of Ketjen Black® was added to the solution. One drop of Triton™ X-100 (Sigma-Aldrich) as a surfactant was also added to achieve a good dispersion of carbon. Then, the mixture was stirred at room temperature for 24 hours, and a darker solution was obtained. The solution was centrifuged and washed with deionized water and then the precipitate was dried overnight at 60-75° C. A green powder called FPnccKbsol01 was obtained.

Figure 21:
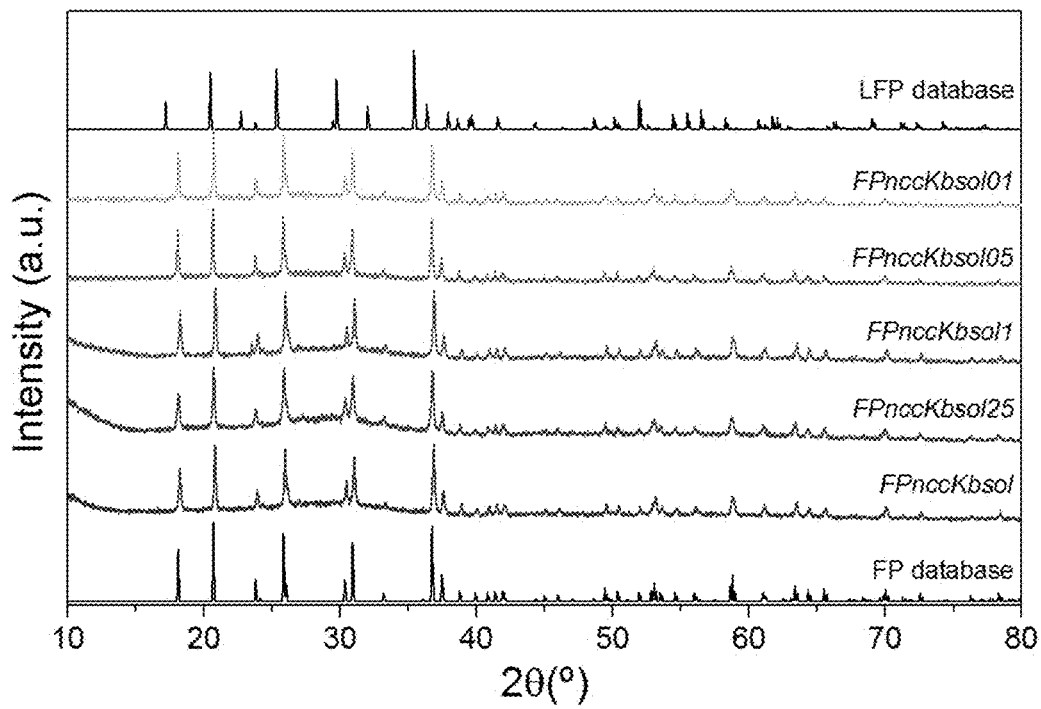
FIG. 21 shows X-ray diffraction patterns of delithiated samples FPnccKBsol, FPnccKBsol25, FPnccKBsol1, FPnccKBsol05, FPnccKBsol01 from Example 10 compared with LFP and FP data from literature.

Each sample obtained after delihitation was analyzed by X-Ray diffraction (FIG. 21). XRD patterns revealed that every compound crystallized in the characteristic orthorhombic olivine phase (Pnma) and the unit cell parameters determined by Le Bail refinements are summarized in Table 4. In all cases the delithiation was complete.

TABLE 4

Summary of the unit cell parameters refined by profile matching of the samples obtained after the delithiation process using different Ketjen black® amounts (Example 10).

|  | a (Å) | b (Å) | c (Å) |
| --- | --- | --- | --- |
| $FePO_4$ reference | 9.8142(2) | 5.7893(2) | 4.7820(2) |
| FPnccKBsol (Ex. 1) | 9.8157(4) | 5.7935(2) | 4.7841(2) |
| FPnccKBsol25 | 9.8091(4) | 5.7917(3) | 4.7829(3) |
| FPnccKBsol1 | 9.8177(5) | 5.7943(3) | 4.7856(2) |
| FPnccKBsol05 | 9.8102(4) | 5.7907(2) | 4.7833(2) |
| FPnccKBsol01 | 9.8118(5) | 5.7918(3) | 4.7834(2) |
| $LiFePO_4$ reference | 10.332(4) | 6.010(5) | 4.692(2) |

[a] D. Lepage et al., *Journal of Power Sources*, 2014, 256, 61.
[b] V. A. Streltsov et al., *Acta Cryst. B*, 1993, 49, 147.

Example 11: Effect of Temperature (without Addition of Carbon) on Delithiation $Na_2S_2O_8$ (5.2263 g, Sigma-Aldrich, 98%) was dissolved in 250 mL of deionized water. After that, 7.0180 g of LFPncc were added to the solution according to Equation 1 and the mixture was stirred until a homogenized solution was obtained. The solution was then stirred at 60° C. for 24 hours; a green solution was obtained. The solution was centrifuged and washed with deionized water, and then the precipitate was dried overnight at 60-75° C. A green powder called FPnccT was obtained.

Figure 22:
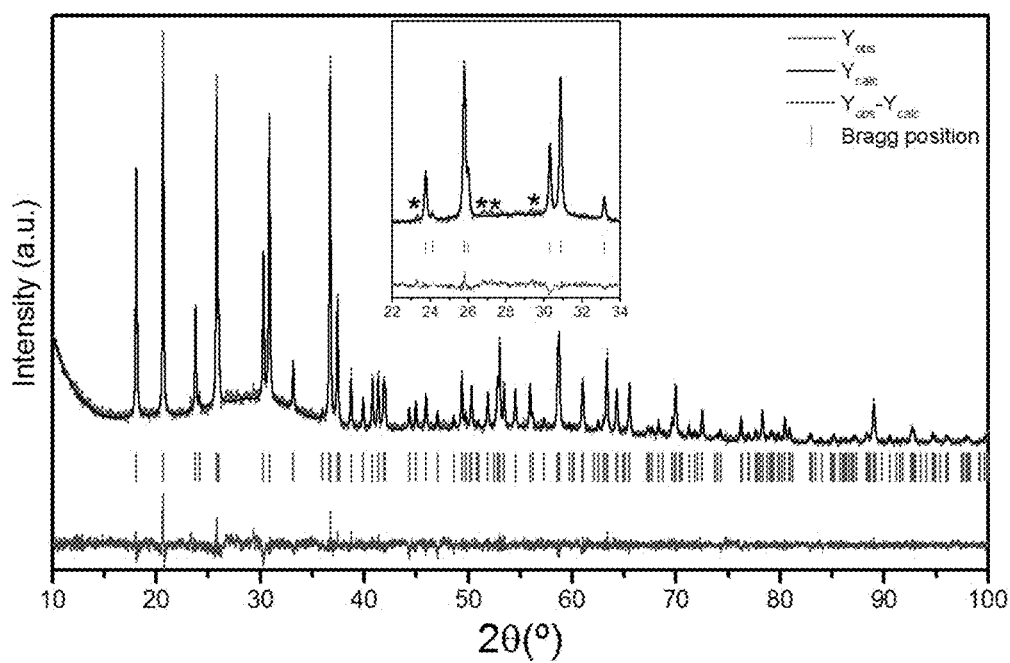
FIG. 22 shows the Le Bail profile matching for FPnccT from Example 11.

Structural characterization and phase identification were carried out using X-Ray diffraction patterns. FIG. 22 shows the XRD of the compound obtained after delithiation at 60° C., which reveals that the compound crystallized with the characteristic orthorhombic olivine phase (Pnma) and the unit cell parameters determined by Le Bail refinement were a=9.8088(7) Å, b=5.7889(4) Å and c=4.7808(4) Å, in agreement with those reported for FP. However, some peaks highlighted in the inset of FIG. 22 were also observed and assigned to unknown impurities.

Example 12: Other Delithiation Procedures

In this example, $H_2O_2$ in acetic acid is tested as oxidizing agent. The samples used were LFPncc as in the previous examples and $LiFe_{0.8}Mn_{0.2}PO_4$ carbon coated and non-coated synthesized at CIC EnergiGUNE by solid state. In Examples 12(a) to 12(f), $H_2O_2$ acetic acid is used as an oxidizing agent, whereas Examples 12(g)-12(h), $Na_2S_2O_8$ will be used for comparison (in the presence of carbon, either from a coating or added as a powder). Different reaction times have also been studied in Examples 12(e) and 12(f).

(a) LFPncc (0.2013 g) was added to a solution of 30 mL of deionized water containing 1 mL of hydrogen peroxide (Fischer Scientific, 30% w/v) and 1 mL of acetic acid (Sharlau, extra pure). The solution was vigorously stirred for 1 h. Then, the solution was filtered and washed with deionized water. The precipitate was dried overnight at 60° C. and the sample was labelled as $FPnccH_2O_2\_1$ h.

(b) LFPcc (0.2007 g) was added to a solution of 30 mL of deionized water containing 1 mL of hydrogen peroxide (Fischer Scientific, 30% w/v) and 1 mL of acetic acid (Sharlau, extra pure). The solution was vigorously stirred for 1 h, filtered and washed with deionized water. The precipitate was then dried overnight at 60° C. and the sample was labelled as $FPccH_2O_2\_1$ h.

(c) Non-carbon coated $LiFe_{0.8}Mn_{0.2}PO_4$ (0.2002 g) was added to a solution of 30 mL of deionized water containing 1 mL of hydrogen peroxide (Fischer Scientific, 30% w/v) and 1 mL of acetic acid (Sharlau, extra pure). The solution was vigorously stirred for 1 h, filtered and washed with deionized water. Then the precipitate was dried overnight at 60° C. and the sample was labelled as $FMPnccH_2O_2\_1$ h.

(d) Carbon coated $LiFe_{0.8}Mn_{0.2}PO_4$ (0.2008 g) was added to a solution of 30 mL of deionized water containing 1 mL of hydrogen peroxide (Fischer Scientific, 30% w/v) and 1 mL of acetic acid (Sharlau, extra pure). The solution was vigorously stirred for 1 h, filtered and washed with deionized water. The precipitate obtained was dried overnight at 60° C. and the sample was labelled as $FMPccH_2O_2\_1$ h.

(e) Non-carbon coated $LiFe_{0.8}Mn_{0.2}PO_4$ (0.2004 g) was added to a solution of 30 mL of deionized water containing 1 mL of hydrogen peroxide (Fischer Scientific, 30% w/v) and 1 mL of acid acetic (Sharlau, extra pure). The solution was vigorously stirred for 24 h, filtered and washed with deionized water. The precipitate obtained was dried overnight at 60° C. and the sample was labelled as $FMPnccH_2O_2\_24$ h.

(f) Carbon coated $LiFe_{0.8}Mn_{0.2}PO_4$ (0.2011 g) was added to a solution of 30 mL of deionized water containing 1 mL of hydrogen peroxide (Fischer Scientific, 30% w/v) and 1 mL of acetic acid (Sharlau, extra pure). The solution was vigorously stirred for 24 h, filtered and washed with deionized water. The precipitate obtained was dried overnight at 60° C. and the sample was labelled as FMPccH$_2$O$_2$_24 h.

(g) Na$_2$S$_2$O$_8$ (0.1491 g, Sigma-Aldrich, 98%) was dissolved in 20 mL of deionized water. Non-carbon coated LiFe$_{0.8}$Mn$_{0.2}$PO$_4$ (0.2008 g) was added to the solution according to Equation 1 and the mixture was stirred until a homogenized solution was obtained. Then, 0.0102 g of Ketjen Black® (5%) was added into the solution together with one drop of Triton™ X-100 (Sigma-Aldrich) as a surfactant for a good dispersion of carbon. Then, the solution was kept under stirring at room temperature for 24 hour. The solution was centrifuged and washed with deionized water, and then the precipitate was dried overnight at 60-75° C. The sample was labelled as FMPnccS$_2$O$_8$_24 h.

(h) Na$_2$S$_2$O$_8$ (0.1527 g, Sigma-Aldrich, 98%) was dissolved in 20 mL of deionized water. Then, carbon coated LiFe$_{0.8}$Mn$_{0.2}$PO$_4$ (0.2009 g) was added to the solution according to Equation 1 and the mixture was stirred at room temperature for 24 hours. The solution was centrifuged and washed with deionized water and then the precipitate was dried overnight at 60-75° C. The sample was labelled as FMPccS$_2$O$_8$_24 h.

Figure 23:
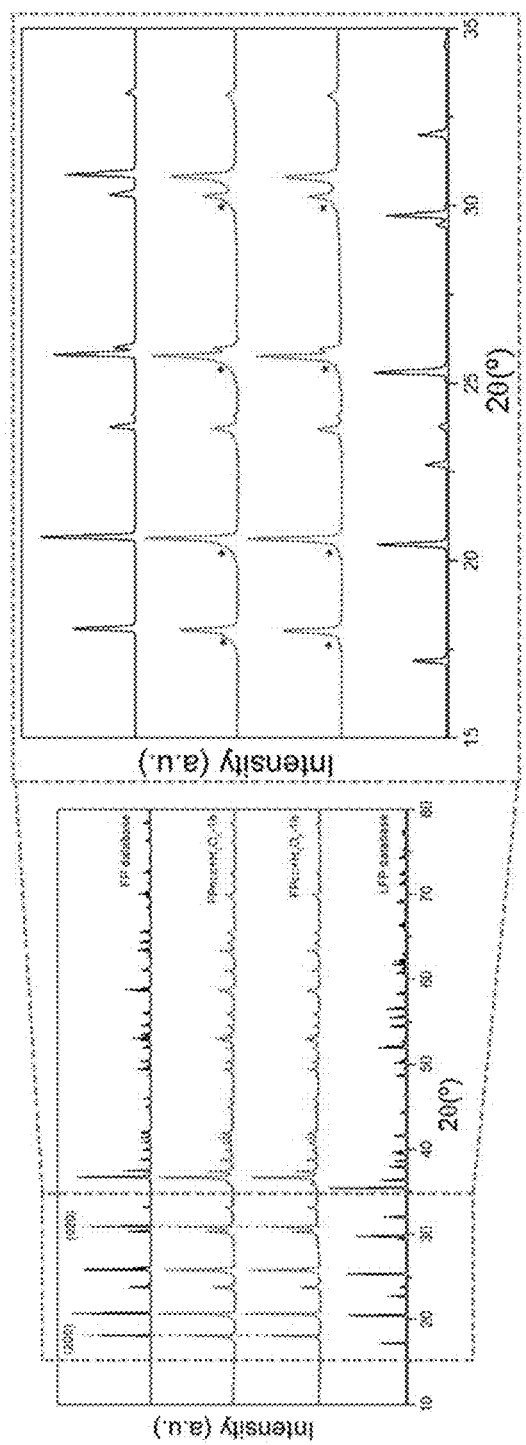
FIG. 23 shows XRD patterns of LFPncc and LFPcc using $H_2O_2$/Acetic acid as in Examples 12(a) and 12(b) compared with LFP and FP data from literature.

Structural characterization through X-Ray diffraction measurements was carried out to evaluate the effect of the oxidizing agent. FIG. 23 shows XRD patterns of samples obtained after delithiation of LFPncc and LFPcc using hydrogen peroxide (Examples 12(a) and 12(b)). In both cases, delithiation was successfully achieved (samples labeled as FPnccH$_2$O$_2$_1 h and FPccH$_2$O$_2$_1 h). However, shoulders in the left side of the peaks have also been observed. This fact could be attributed to unidentified impurities or other compositions related to Li$_{1-x}$FePO$_4$. The XRD diffraction patterns have also been refined by Le Bail profile matching to determine the unit cell parameters of the main phase (Table 5), in agreement with those reported for FP.

Figure 24:
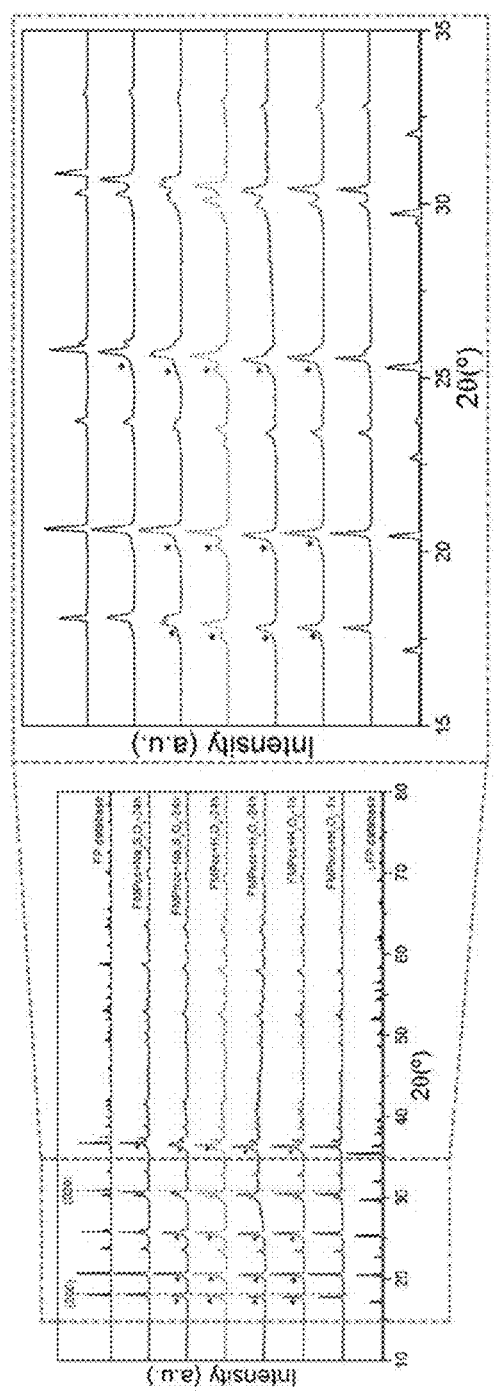
FIG. 24 shows XRD patterns of LFMPncc and LFMPcc samples using $H_2O_2$/Acetonitrile or $Na_2S_2O_8$ in aqueous media as in Examples 12(c) to 12(h) compared with LFP and FP data from literature.
Figure 25:
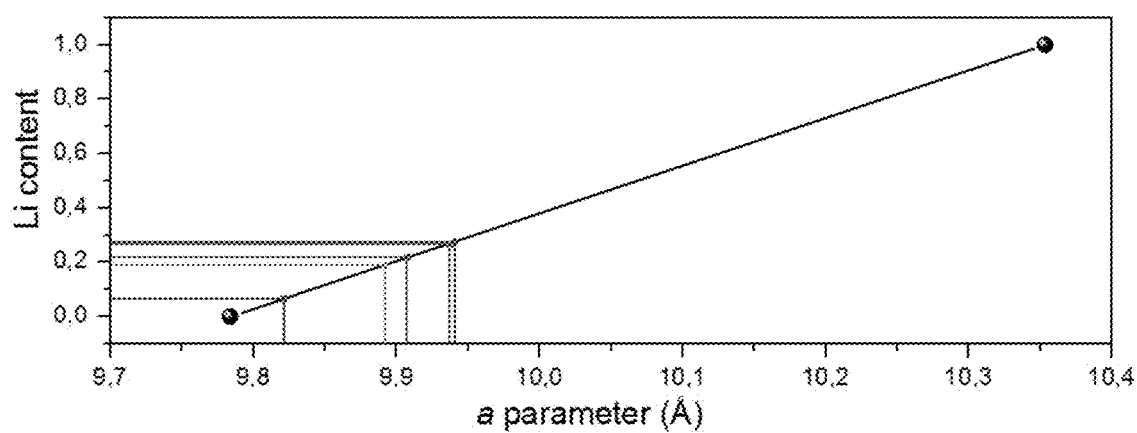
FIG. 25 shows the evolution of unit cell parameters according to Vegard's Law of $LiFe_{0.8}Mn_{0.2}PO_4$.

Carbon coated and non-coated LiFe$_{0.8}$Mn$_{0.2}$PO$_4$ synthesized at CIC EnergiGUNE by solid state were also used as a starting lithiated phase. This compound, LiFe$_{0.8}$Mn$_{0.2}$PO$_4$, has a higher redox potential due to the presence of manganese into the structure. In the first tests, H$_2$O$_2$ in acetic acid was used as an oxidizing agent and the stirring time was 1 h (Examples 12(c) and 12(d)) and 24 h (Examples 12(e) and 12(f)). FIG. 24 shows the evolution of the XRD patterns for carbon coated and non-coated LiFe$_{0.8}$Mn$_{0.2}$PO$_4$ as a function of the stirring time. In all cases, extra peaks attributed to unidentified impurities (highlighted *) were observed. In addition, the unit cell parameters of the main phase obtained after Le Bail refinements indicated that they were higher than the unit cell parameters of the reported Fe$_{0.8}$Mn$_{0.2}$PO$_4$. This fact indicates that delithiation was not complete (see Table 5). As such, to estimate the final composition of the Li$_{1-x}$Fe$_{0.8}$Mn$_{0.2}$PO$_4$ samples obtained after the delithiation process using H$_2$O$_2$/acetic acid as an oxidizing agent, their cell parameters were plotted together with those of LiFe$_{0.8}$Mn$_{0.2}$PO$_4$ and Fe$_{0.8}$Mn$_{0.2}$PO$_4$ (FIG. 25). The final composition of the Li$_{1-x}$Fe$_{0.8}$Mn$_{0.2}$PO$_4$ estimated using Vegard's Law is listed in Table 5.

Finally, Na$_2$S$_2$O$_8$ was tested as an oxidizing agent (as in Examples 1-10) using carbon coated or non-coated LiFe$_{0.8}$Mn$_{0.2}$PO$_4$ as the lithiated phase (Examples 12(g) and 12(h)). FIG. 24 and Table 5 show X-ray diffraction patterns and the unit cell parameters determined by Le Bail refinement (FMPnccS$_2$O$_8$_24 h and FMPccS$_2$O$_8$_24 h), respectively. Based on these results, complete delithiation was achieved for carbon coated LiFe$_{0.8}$Mn$_{0.2}$PO$_4$ (FMPccS$_2$O$_8$_24 h), in which both XRD pattern and unit cell parameters agree with the reported ones for Fe$_{0.8}$Mn$_{0.2}$PO$_4$. Otherwise, when non-coated LiFe$_{0.8}$Mn$_{0.2}$PO$_4$ was used (FMPnccS$_2$O$_8$_24 h), the presence of a second phase was also observed (*) despite carbon was added in the reaction medium; however, the delithiation was almost complete. This fact agrees with the final composition estimated by Vergard's Law (FIG. 25 and Table 5), which indicates the presence of a very little amount of remaining Li in the structure (Li$_{\approx 0.06}$Fe$_{0.8}$Mn$_{0.2}$PO$_4$).

TABLE 5

Refined unit cell parameters of compounds obtained after delithiation using different oxidizing agents

| | a (Å) | b (Å) | c (Å) | Expected composition** |
|---|---|---|---|---|
| FePO$_4$ reference[a] | 9.8142(2) | 5.7893(2) | 4.7820(2) | |
| Fe$_{0.8}$Mn$_{0.2}$PO$_4$ ref.* | 9.80 | 5.82 | 4.705 | |
| FPnccH$_2$O$_2$_1 h | 9.8095(8) | 5.7911(5) | 4.7819(5) | FePO$_4$ |
| FPccH$_2$O$_2$_1 h | 9.8094(6) | 5.7897(4) | 4.7801(3) | FePO$_4$ |
| FMPnccH$_2$O$_2$_1 h | 9.9409(4) | 5.8688 (2) | 4.7952(2) | Li$_{\approx 0.27}$Fe$_{0.8}$Mn$_{0.2}$PO$_4$ |
| FMPccH$_2$O$_2$_1 h | 9.9355(5) | 5.8661(3) | 4.7951(3) | Li$_{\approx 0.26}$Fe$_{0.8}$Mn$_{0.2}$PO$_4$ |
| FMPnccH$_2$O$_2$_24 h | 9.9075(7) | 5.8605(7) | 4.7971(7) | Li$_{\approx 0.22}$Fe$_{0.8}$Mn$_{0.2}$PO$_4$ |
| FMPccH$_2$O$_2$_24 h | 9.891(1) | 5.851(1) | 4.7948(9) | Li$_{\approx 0.19}$Fe$_{0.8}$Mn$_{0.2}$PO$_4$ |
| FMPnccS$_2$O$_8$_24 h | 9.822(2) | 5.833(1) | 4.777(1) | Li$_{\approx 0.06}$Fe$_{0.8}$Mn$_{0.2}$PO$_4$ |
| FMPccS$_2$O$_8$_24 h | 9.7788(8) | 5.8110(5) | 4.7787(5) | Fe$_{0.8}$Mn$_{0.2}$PO$_4$ |
| LiFe$_{0.8}$Mn$_{0.2}$PO$_4$ ref.* | 10.335 | 6.022 | 4.775 | |
| LiFePO$_4$ reference[b] | 10.332(4) | 6.010(5) | 4.692(2) | |

*A. Yamada and S. Ch. Chung, *J. Electrochem. Soc.*, 2001, 148(8), A960, data extracted from graphic showing a variation in lattice parameters as a function of Mn content in Li(Mn$_x$Fe$_{1-y}$)PO$_4$
**determined by Vegard's Law taking into account the a unit cell parameters of LiFe$_{0.8}$Mn$_{0.2}$PO$_4$ and Fe$_{0.8}$Mn$_{0.2}$PO$_4$
[a]D. Lepage et al., *Journal of Power Sources*, 2014, 256, 61.
[b]V. A. Streltsov et al., *Acta Cryst. B*, 1993, 49, 147.

As shown in Comparative Example 1 and Examples 1 to 10, non-carbon coated LFP cannot be delithiated using Na$_2$S$_2$O$_8$/H$_2$O as an oxidizing agent at room temperature without at least a small amount of carbon in the solution. Any type of carbon may be used as a carbon source in the delithiation procedure.

Detlithiation of non-carbon coated LFP can be achieved without carbon in the solution using Na$_2$S$_2$O$_8$ as an oxidizing agent, but at a temperature of 60° C. On the other hand, the final compound presents some impurities.

Na$_2$S$_2$O$_8$ may delithiate LiFe$_{0.8}$Mn$_{0.2}$PO$_4$ while the use of H$_2$O$_2$/acetic acid always leads to partial delithiation of LiFe$_{0.8}$Mn$_{0.2}$PO$_4$. Delithiation of carbon coated and non-coated LiFePO$_4$ was achieved using H$_2$O$_2$/acetic acid as an oxidizing agent, however, the XRD patterns of the final compounds show extra-peaks which could be attributed to impurities.

Without wishing to be bound by theory, there may be a kinetic effect involved since, taking into account redox potentials, both H$_2$O$_2$ and Na$_2$S$_2$O$_8$ should lead to spontaneous delithiation.

$$E(S_2O_8/Fe)=E(S_2O_8)-E(Fe)=5.05\ V-3.5\ V=1.55\ V>0$$

$$E(H_2O_2/Fe)=E(H_2O_2)-E(Fe)=4.78\ V-3.5\ V=1.28\ V>0$$

$$E(S_2O_8/Mn)=E(S_2O_8)-E(Mn)=5.05\ V-4.1\ V=0.95\ V>0$$

$$E(H_2O_2/Mn)=E(H_2O_2)-E(Mn)=4.78\ V-4.1\ V=0.68\ V>0$$

Delithiation conditions may be used with other olivines, including LiFe$_{1-x}$Mn$_x$PO$_4$ with various Fe/Mn ratios, for instance, with x>0.50.

Numerous modifications could be made to any of the embodiments described above without departing from the scope of the present invention. Any references, patents or scientific literature documents referred to in this disclosure are incorporated herein by reference in their entirety for all purposes.

The invention claimed is:

1. A process for delithiating a carbon-free olivine, comprising a step of contacting the carbon-free olivine with carbon and an oxidizing agent to obtain a delithiated olivine, wherein the carbon-free olivine is a non-carbon coated olivine and wherein a weight ratio of carbon to olivine is within the range of 0.01% to 15%.

2. The process of claim 1, wherein the carbon-free olivine is of the formula LiMPO$_4$ where M is Fe, Ni, Mn, Co, or a combination thereof.

3. The process of claim 1, wherein the carbon-free olivine is of the formula LiFe$_{(1-x)}$M'$_x$PO$_4$ where M' is Ni, Mn, Co, or a combination thereof, and wherein 0≤x<1.

4. The process of claim 3, wherein M' is Mn, and wherein 0≤x<1.

5. The process of claim 4, wherein x is selected from the range of 0.1 to 0.9.

6. The process of claim 3, wherein x is 0.

7. The process of claim 1, wherein the oxidizing agent is a persulfate.

8. The process of claim 7, wherein the oxidizing agent is potassium or sodium persulfate.

9. The process of claim 8, wherein the oxidizing agent is sodium persulfate (Na$_2$S$_2$O$_8$).

10. The process of claim 1, wherein the source of carbon is selected from carbon black, acetylene black, carbon fibers, carbon nanotubes, graphene, graphite, and any mixture thereof.

11. The process of claim 1, wherein the process is carried out in water or an aqueous solvent.

12. The process of claim 1, further comprising adding a surfactant.

13. The process of claim 12, wherein the surfactant is an alkylphenol ethoxylate surfactant.

14. The process of claim 1, wherein the weight ratio of carbon to olivine is between 0.05% and 10%.

* * * * *